Figure 7:
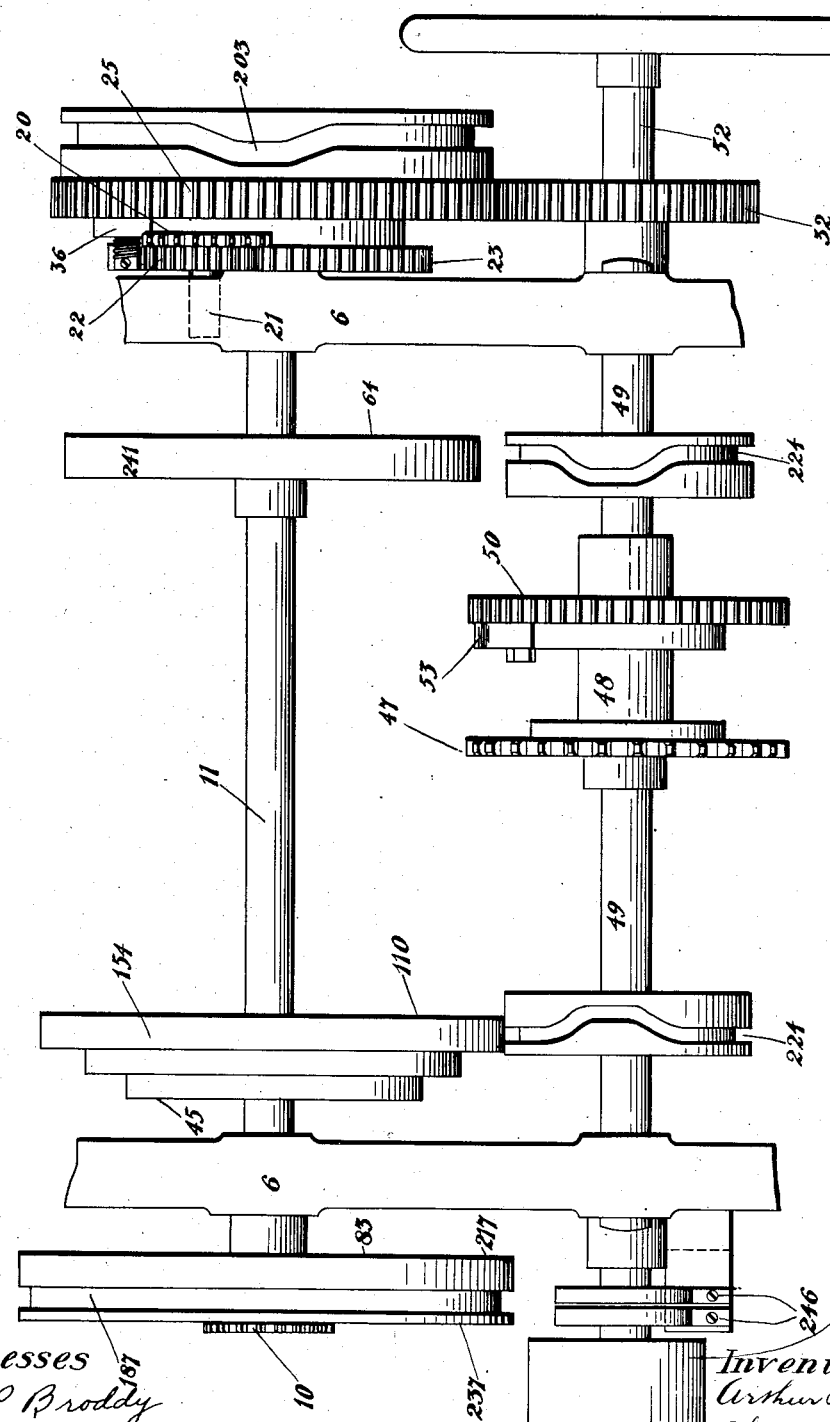

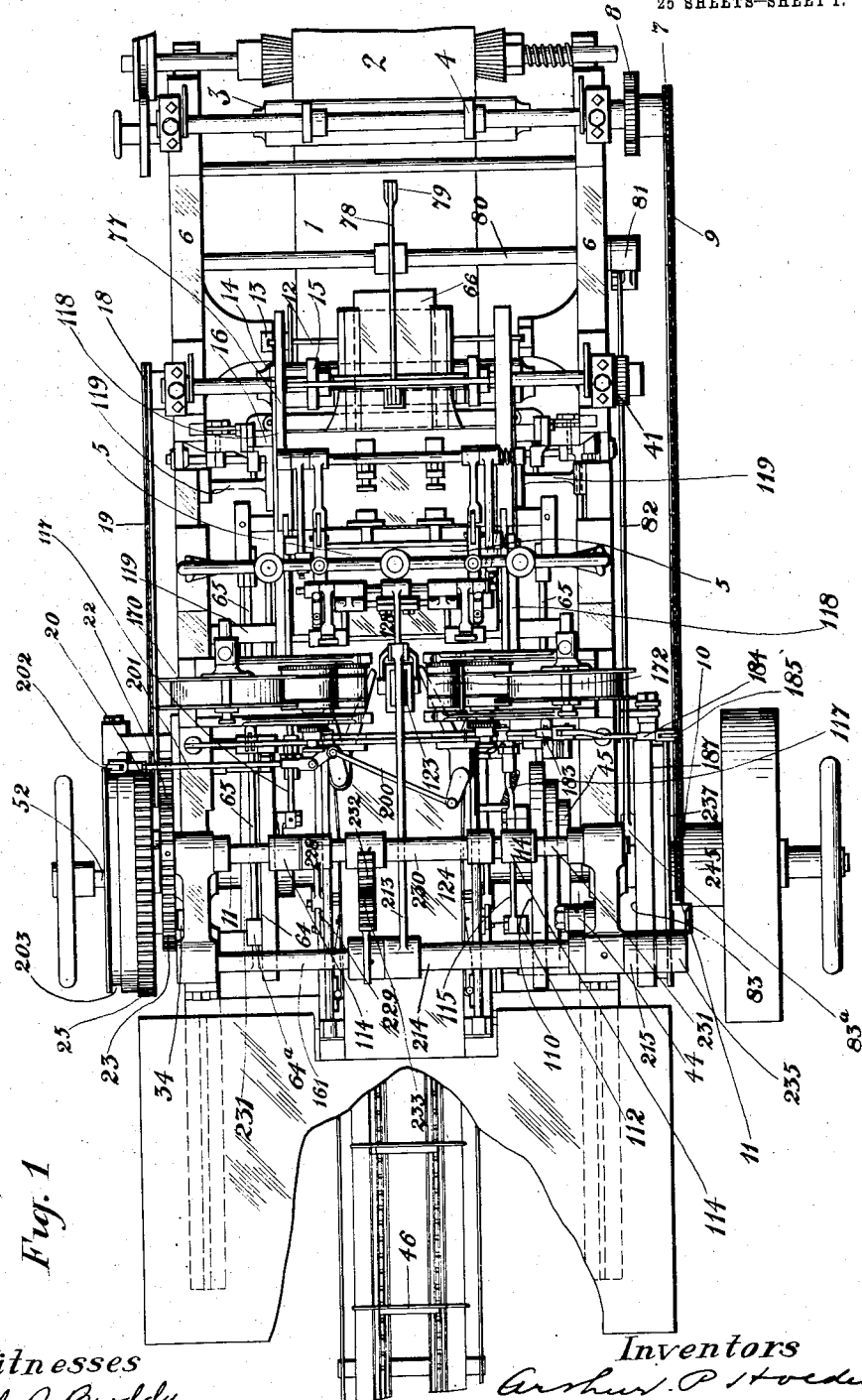

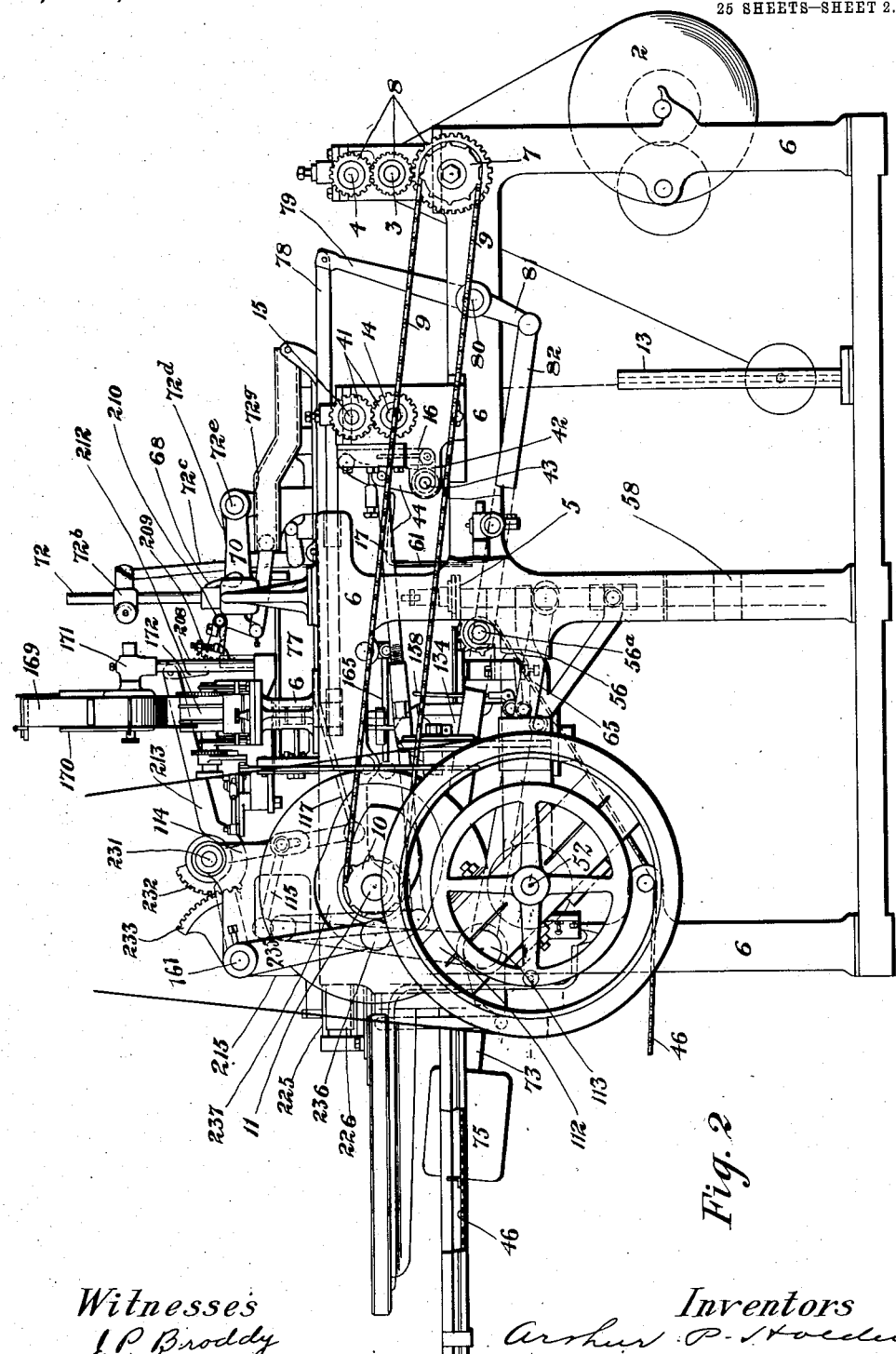

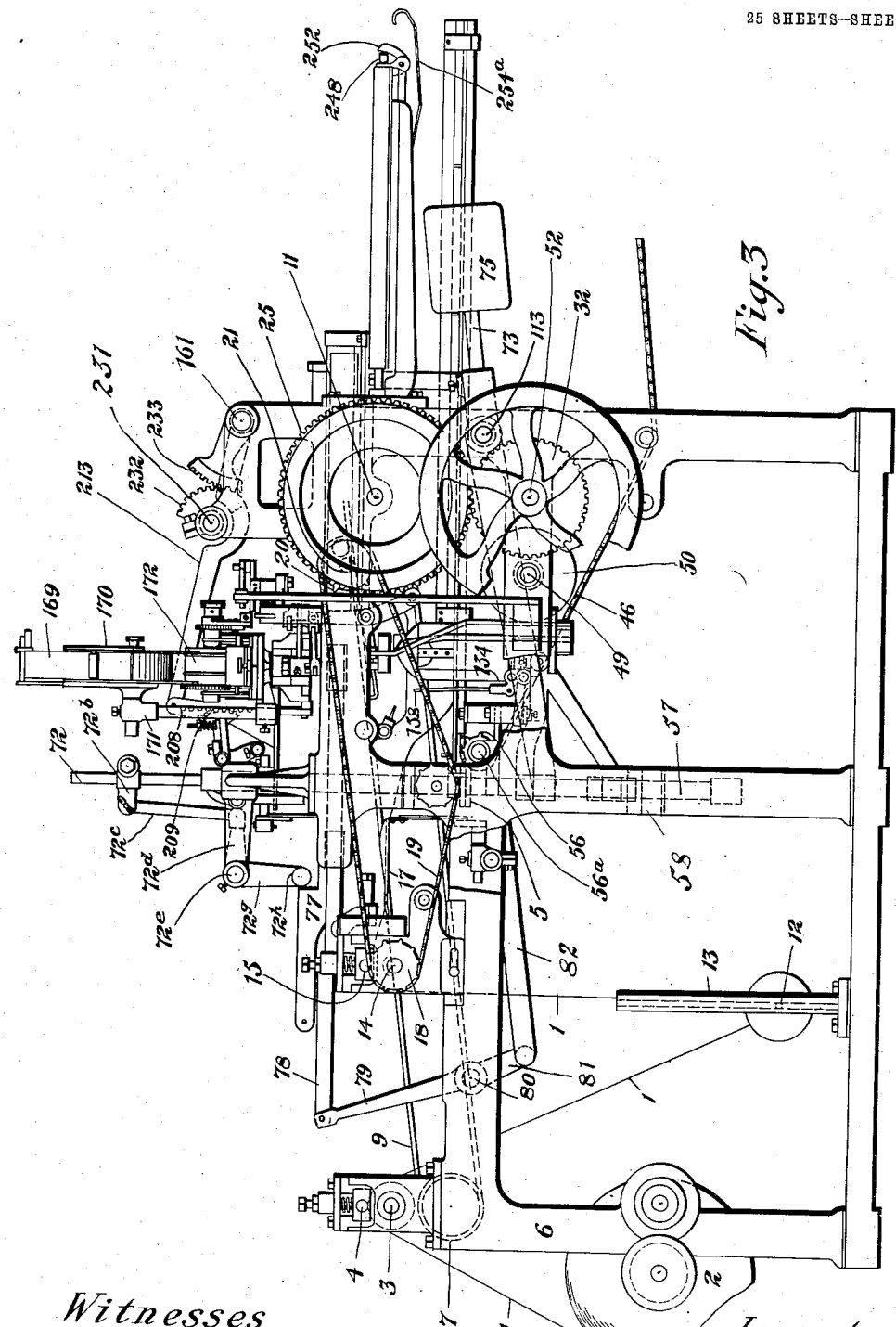

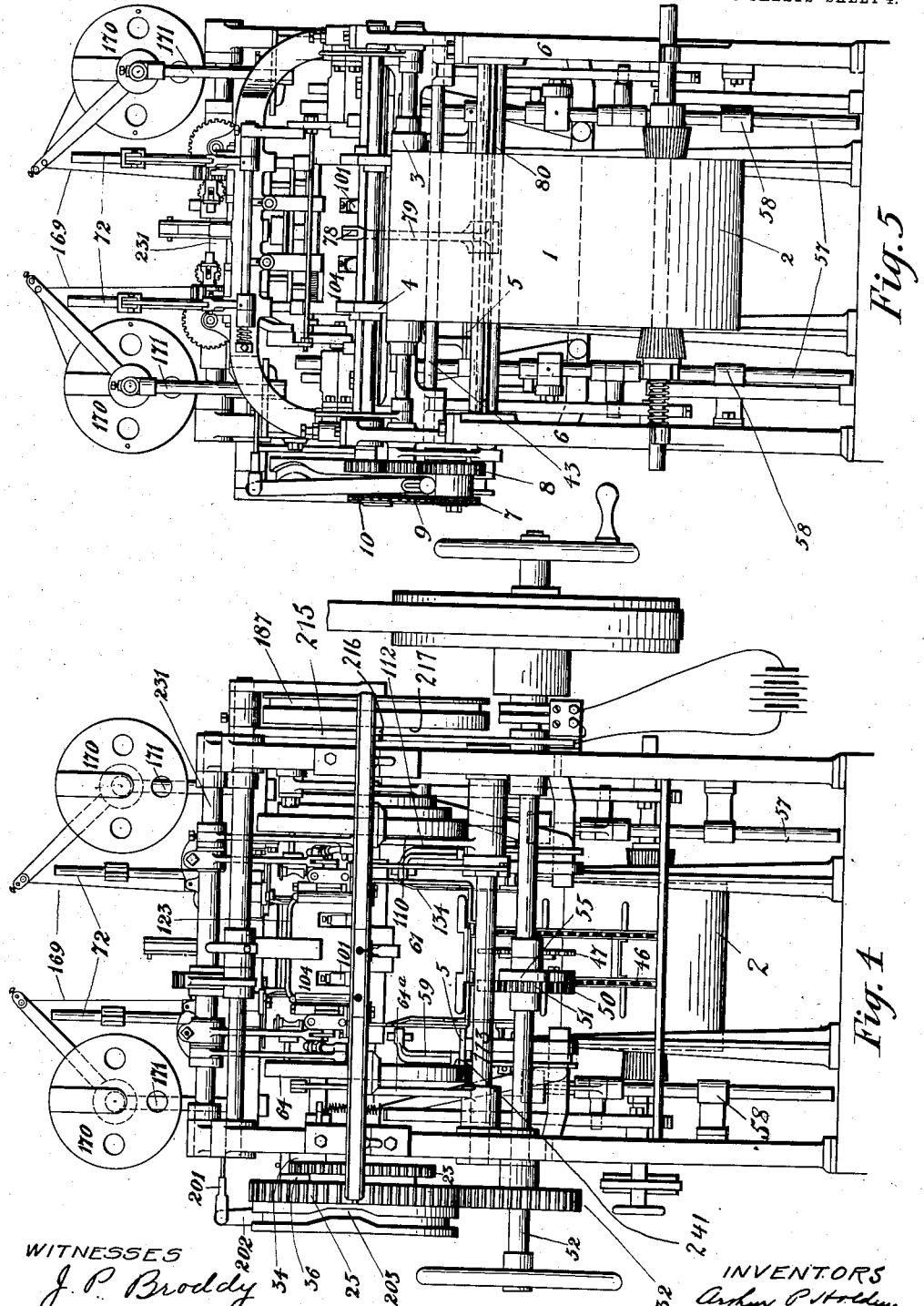

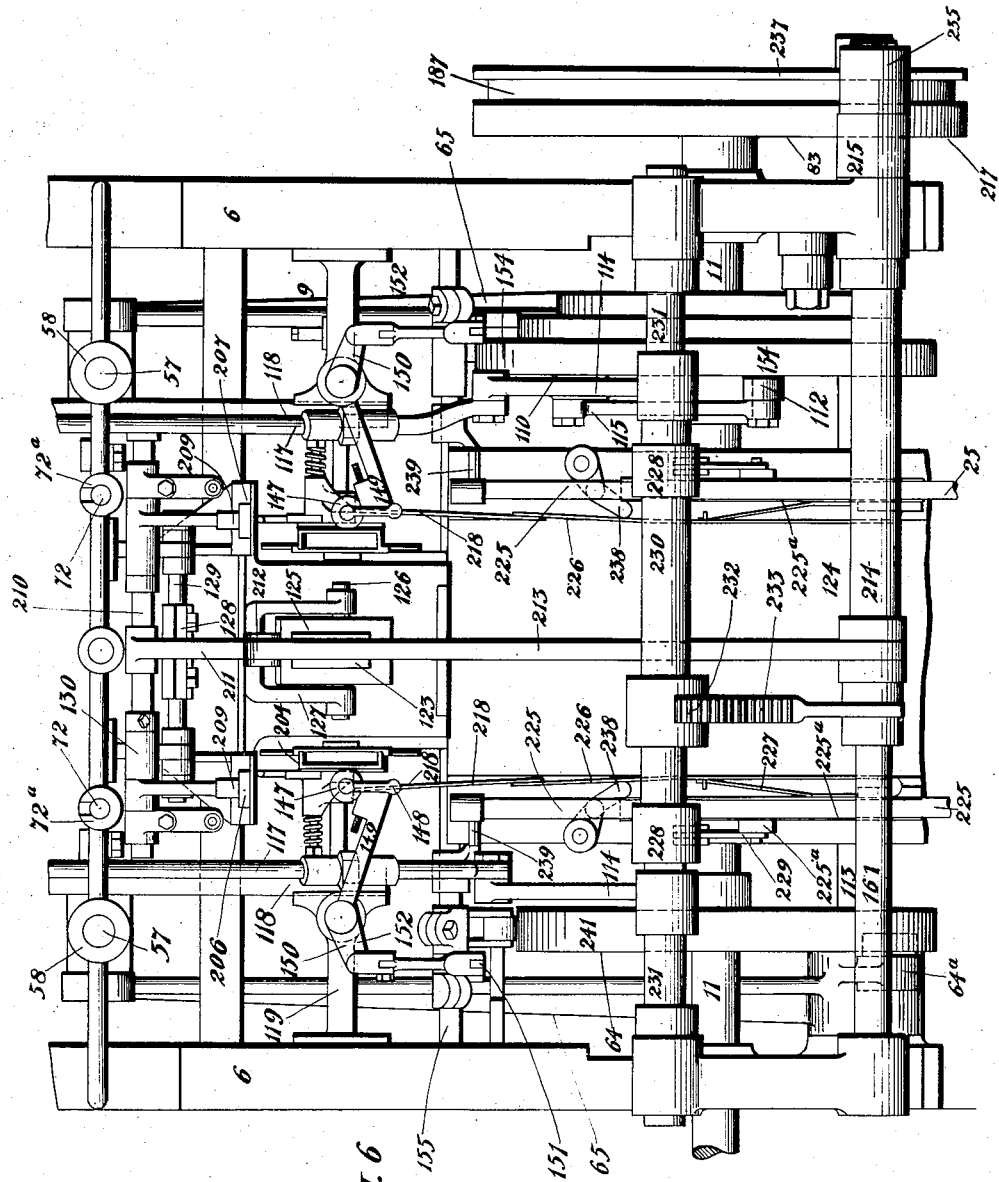

A. P. HOLDEN & P. MORGAN.
WRAPPING MACHINE.
APPLICATION FILED JULY 2, 1913.

1,085,259.

Patented Jan. 27, 1914.
25 SHEETS—SHEET 6.

Witnesses
J. P. Broddy
Edward Bernstein

Inventors
Arthur P. Holden
Philip Morgan
by Chas H Richer
Attorney

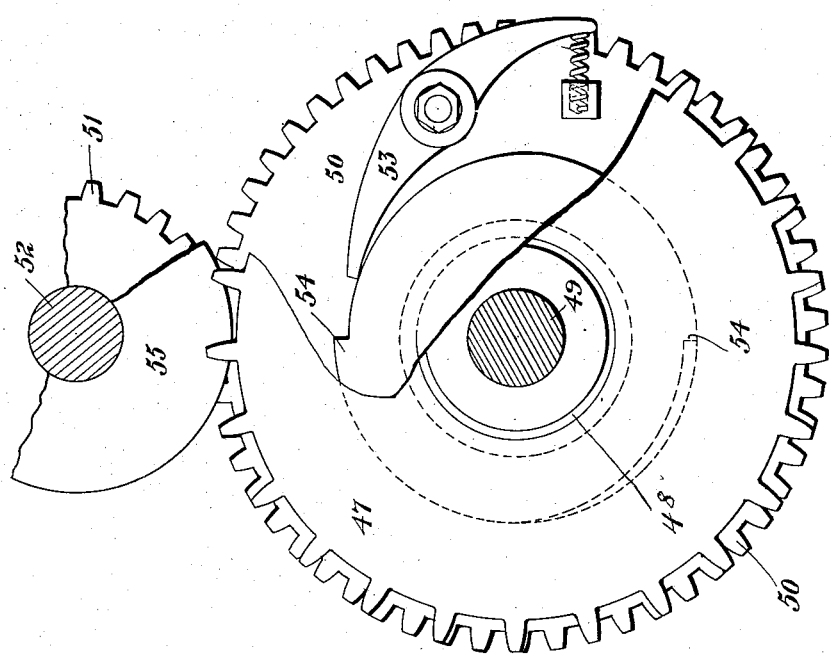
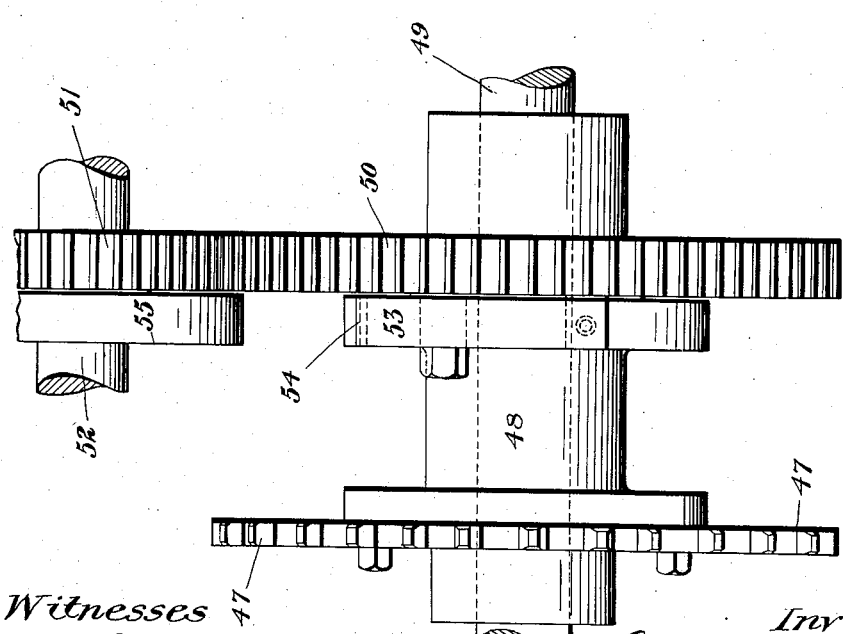

A. P. HOLDEN & P. MORGAN.
WRAPPING MACHINE.
APPLICATION FILED JULY 2, 1913.

1,085,259.

Patented Jan. 27, 1914.
25 SHEETS—SHEET 8.

Witnesses
J. P. Broddy
Edward Bernstein

Inventors
Arthur P. Holden
Philip Morgan
by Chas. H. Riches
Attorney

A. P. HOLDEN & P. MORGAN.
WRAPPING MACHINE.
APPLICATION FILED JULY 2, 1913.

1,085,259.

Patented Jan. 27, 1914.
25 SHEETS—SHEET 13.

Witnesses
J. P. Broddy
Edward Bernstein

Inventors
Arthur P. Holden
Philip Morgan
by Chas. H. Riches
Attorney

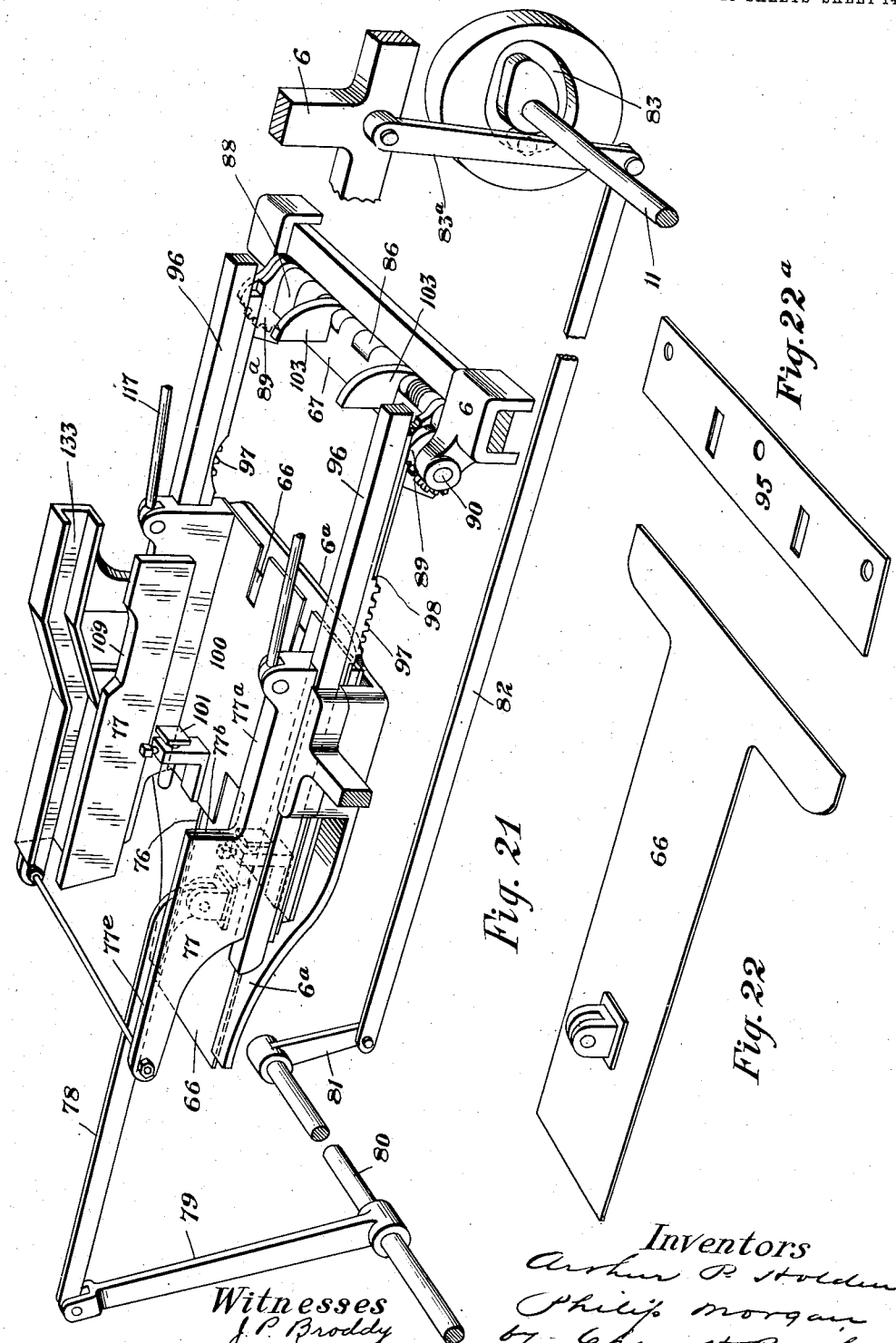

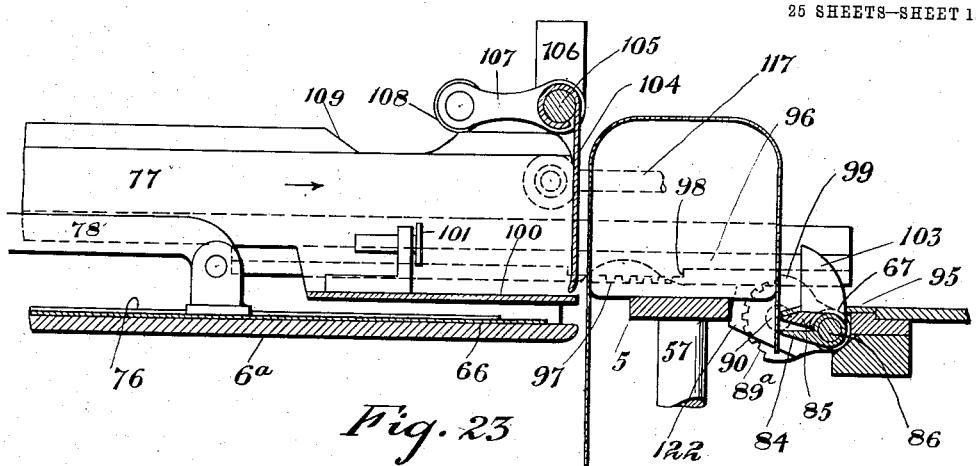
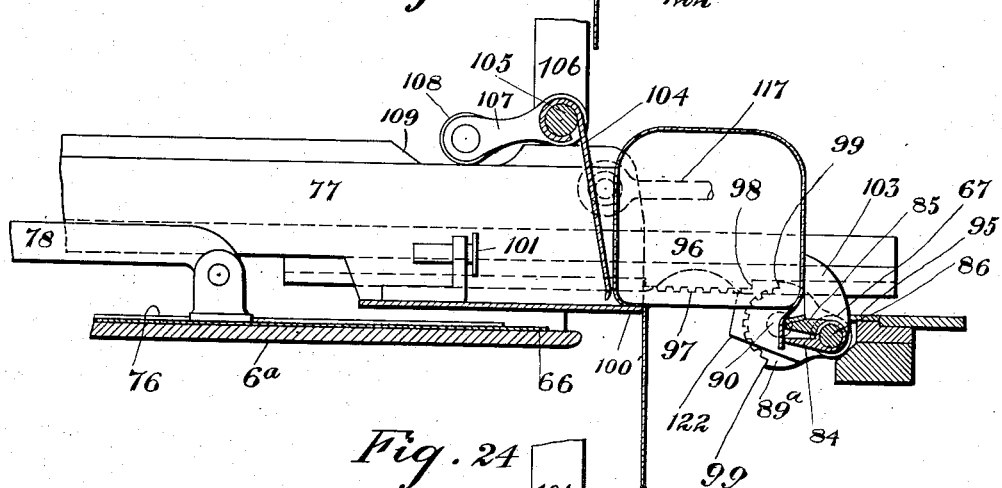
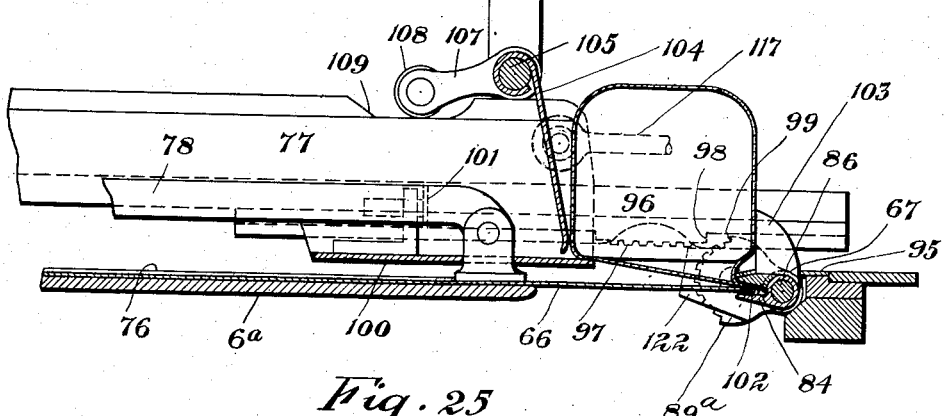

A. P. HOLDEN & P. MORGAN.
WRAPPING MACHINE.
APPLICATION FILED JULY 2, 1913.
1,085,259.
Patented Jan. 27, 1914.
25 SHEETS—SHEET 16.
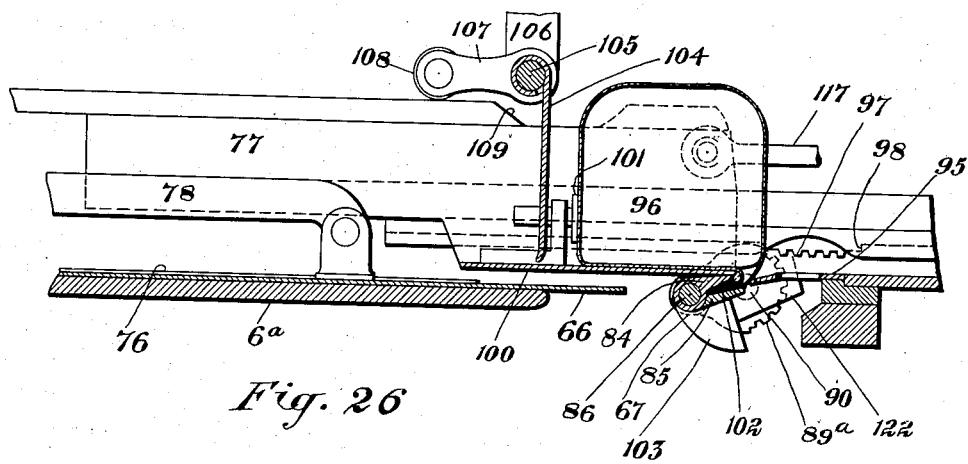
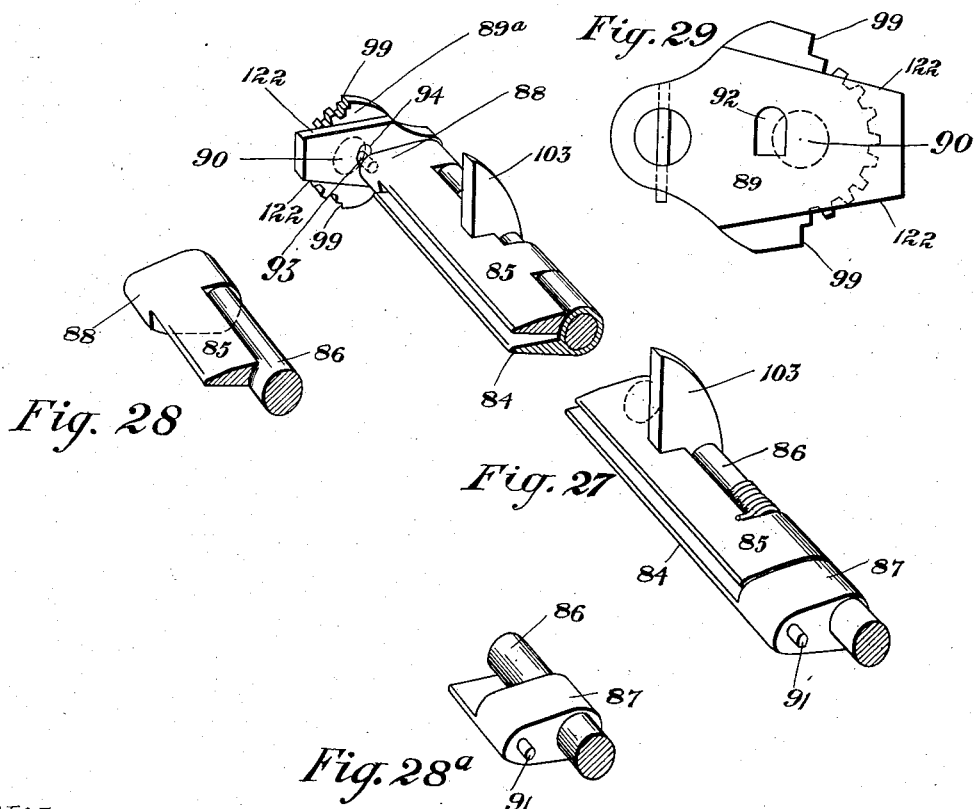
Witnesses
J. P. Broddy
Edward Bernstein
Inventors
Arthur P. Holden
Philip Morgan
by Chas. H. Kisler
Attorney

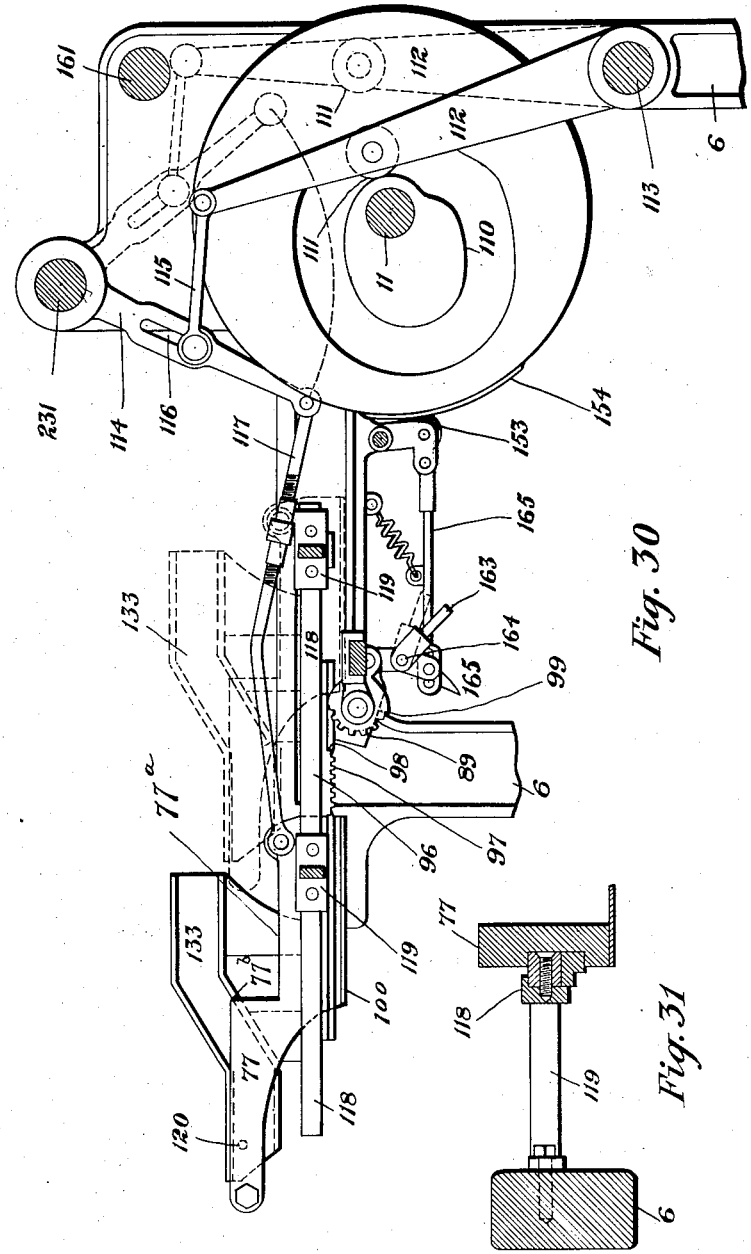

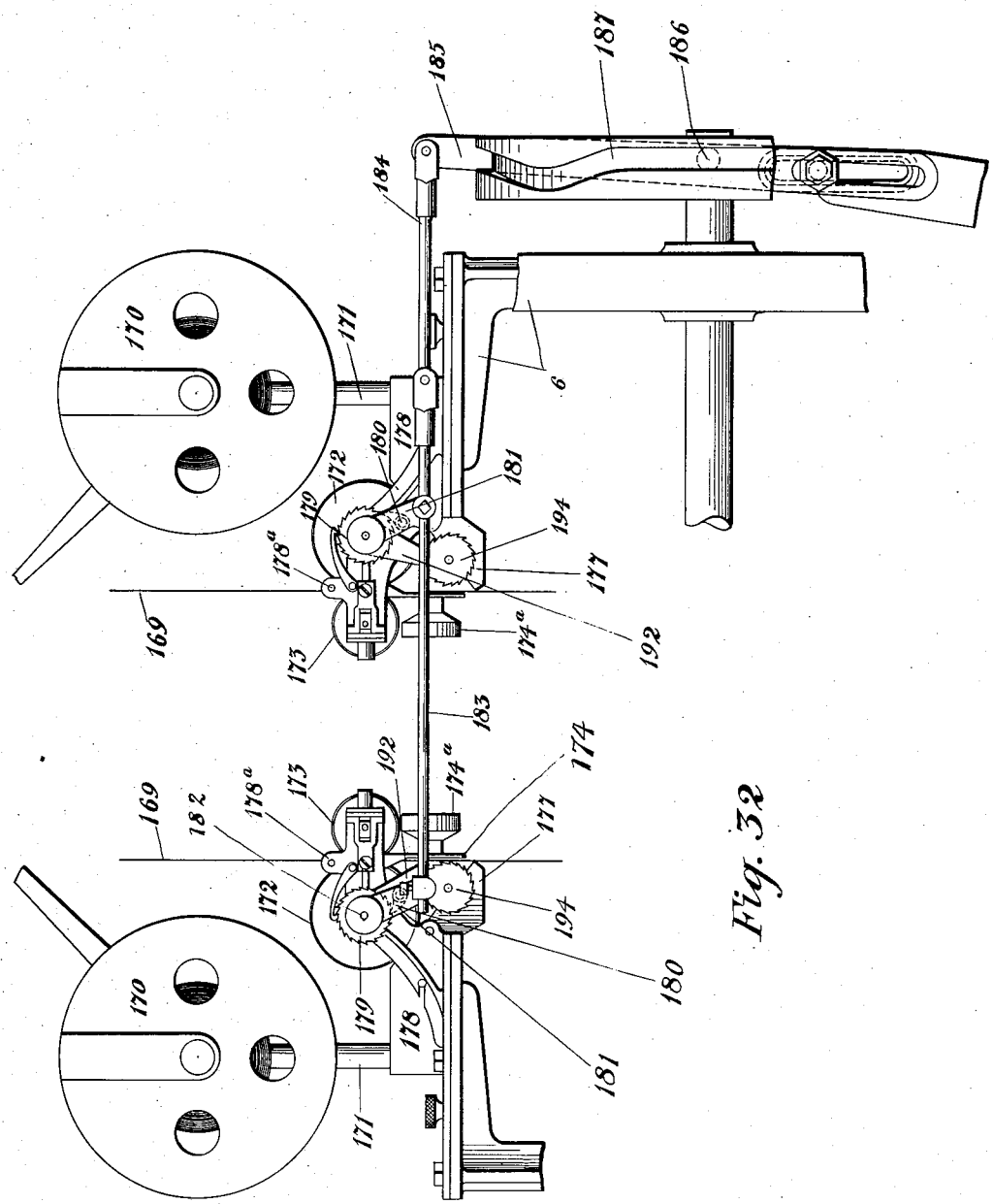

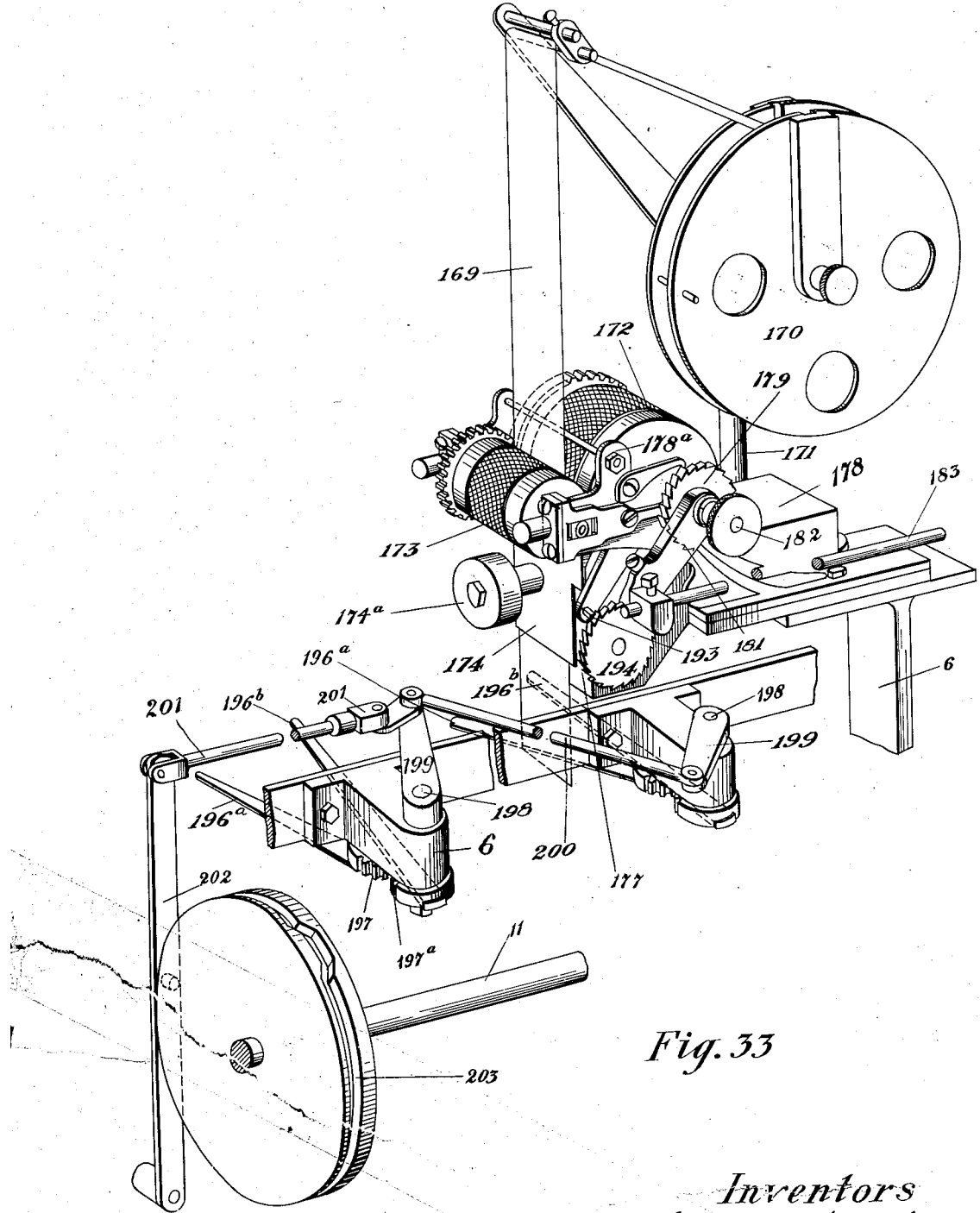

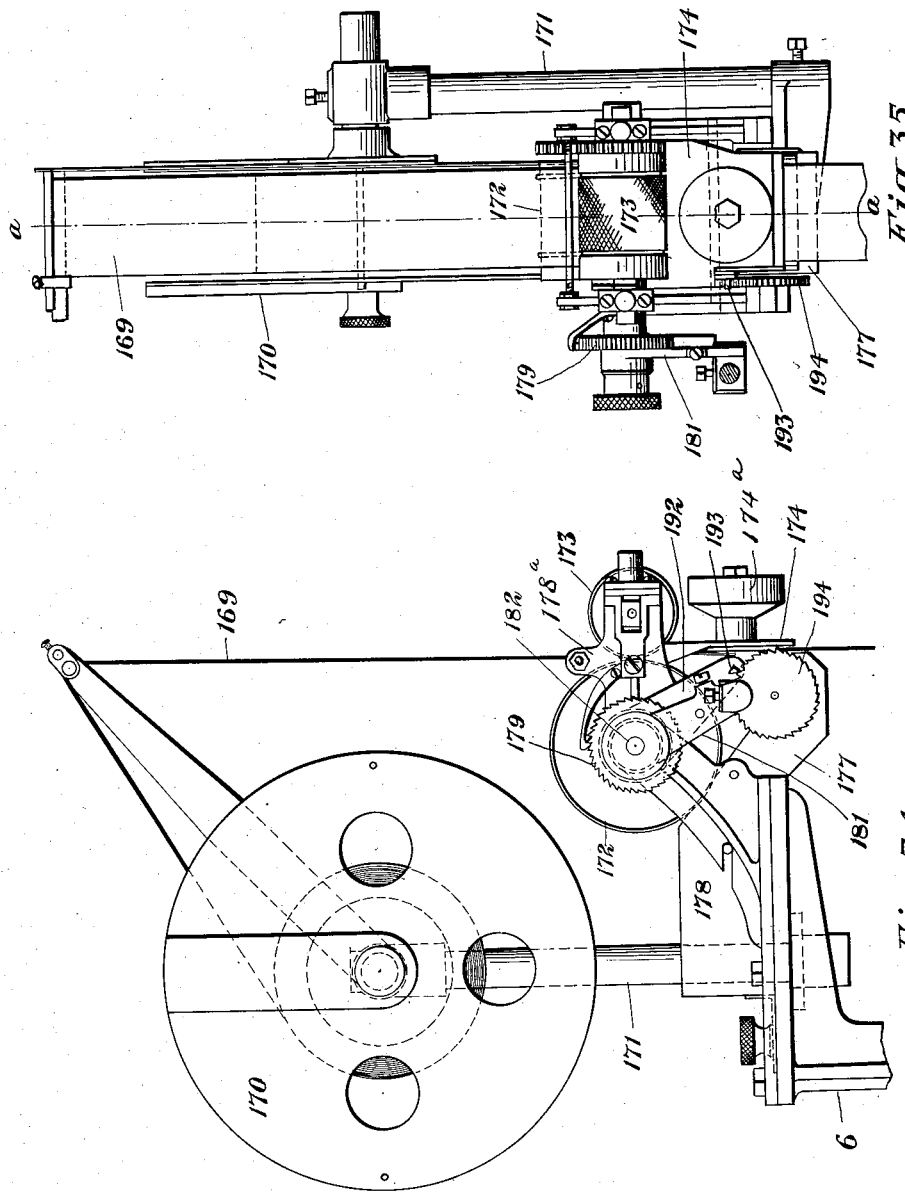

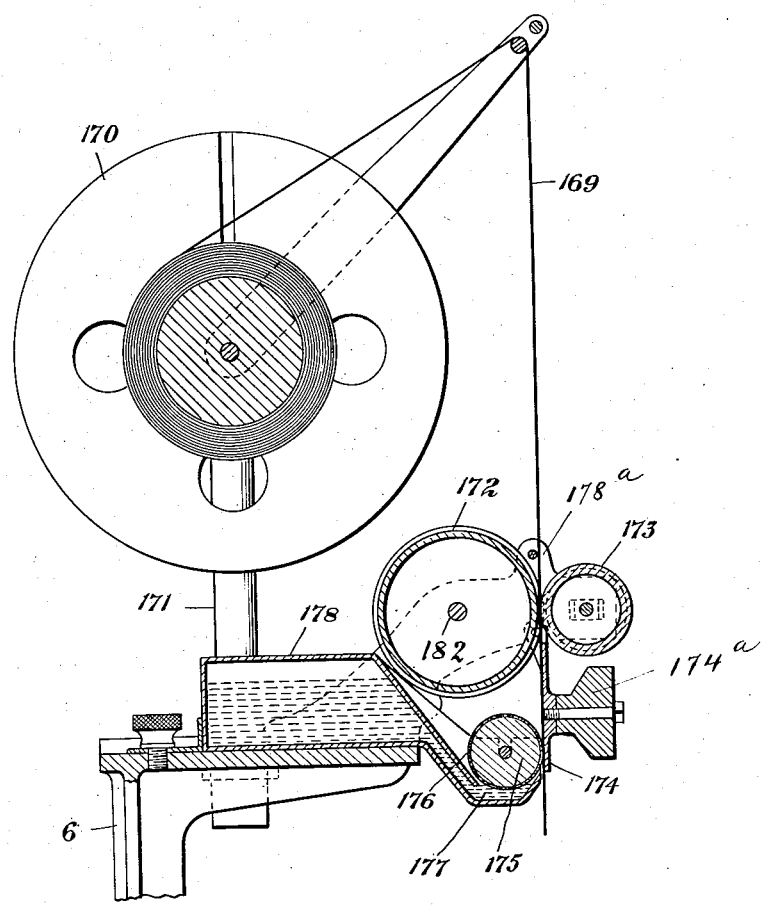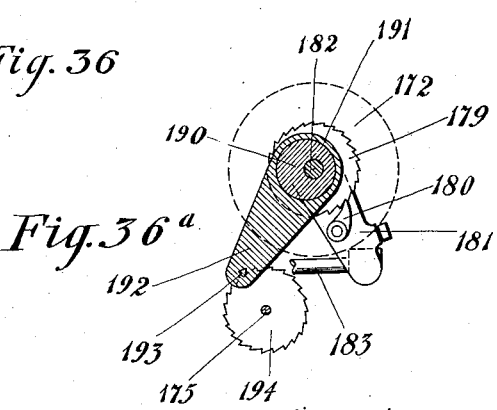

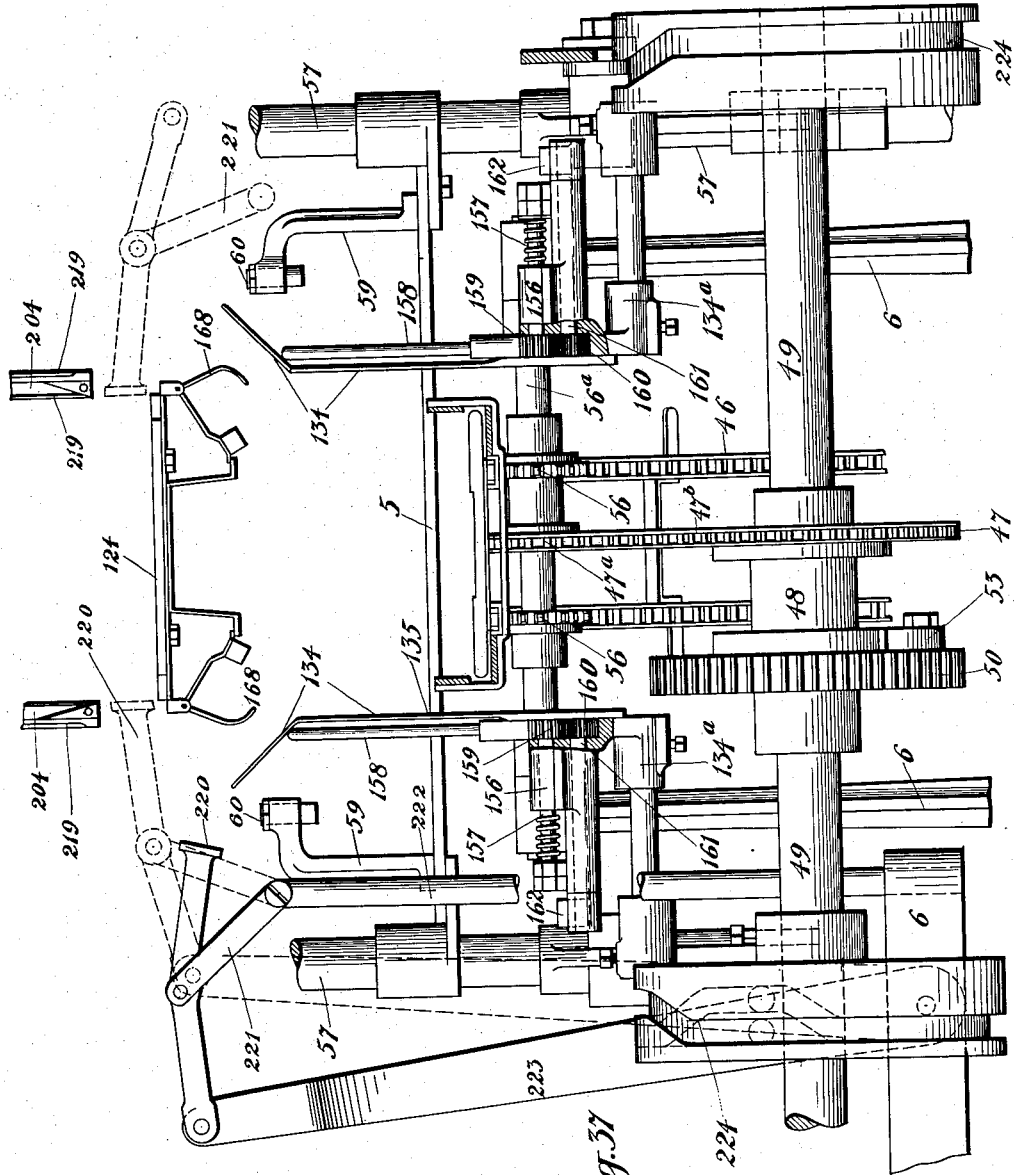

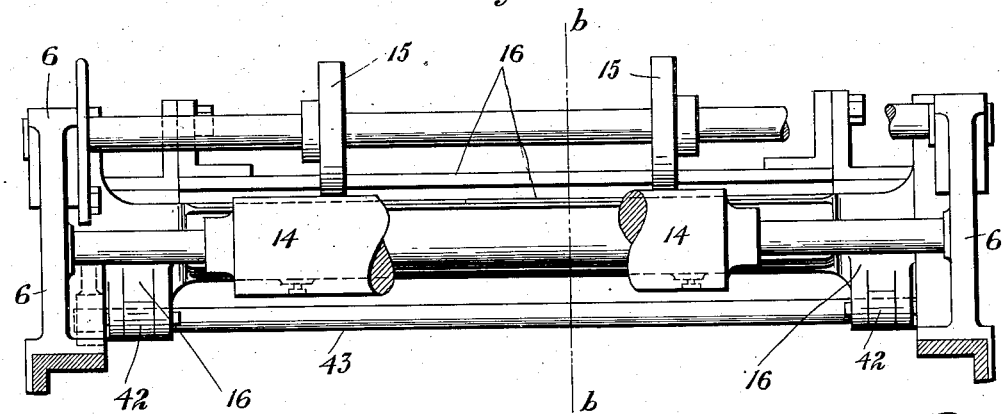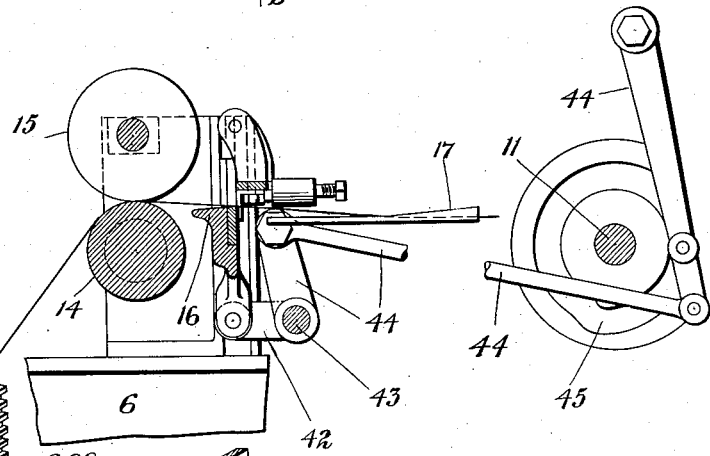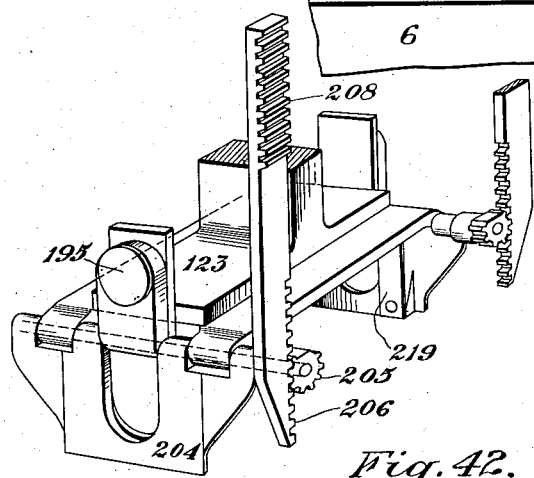

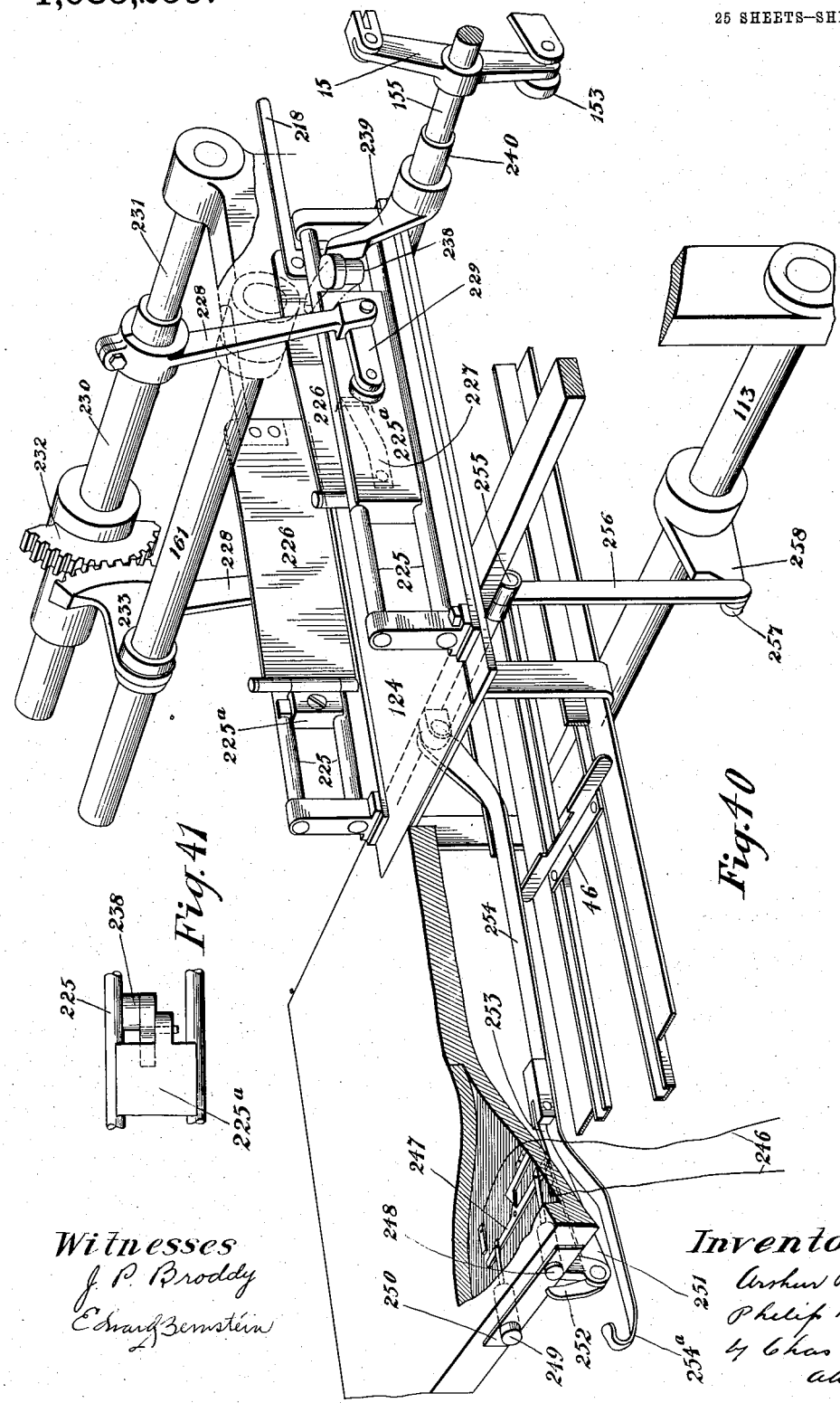

A. P. HOLDEN & P. MORGAN.
WRAPPING MACHINE.
APPLICATION FILED JULY 2, 1913.

1,085,259.

Patented Jan. 27, 1914.

25 SHEETS—SHEET 25.

UNITED STATES PATENT OFFICE.

ARTHUR P. HOLDEN AND PHILIP MORGAN, OF TORONTO, ONTARIO, CANADA, ASSIGNORS TO THE HOLDEN-MORGAN COMPANY, LIMITED, OF TORONTO, ONTARIO, CANADA, A CORPORATION OF ONTARIO.

WRAPPING-MACHINE.

1,085,259.  Specification of Letters Patent.  Patented Jan. 27, 1914.

Application filed July 2, 1913. Serial No. 776,970.

*To all whom it may concern:*

Be it known that we, ARTHUR PEART HOLDEN and PHILIP MORGAN, of the city of Toronto, in the county of York and Province of Ontario, Dominion of Canada, have invented certain new and useful Improvements in Wrapping-Machines; and we hereby declare that the following is a full, clear, and exact description of the same.
Our present invention relates to a machine in which the wrapper is continuously unwound from the wrapper roll, intermittently fed across the path of the article, and cut into desired wrapper lengths, each of which conforms to three sides of its respective article as it is carried therewith to the side folders. These side folders are so constructed and operated as to bring two opposed sides of the unformed wrapper together and fold them lengthwise of their adjacent edges to conform the wrapper to a tubular shape and then inturn the folded edges against the adjacent wrapper side, and by doing so, effectually close that side of the wrapper and prevent it re-opening under normal conditions of use.

From the side folders, the article and its tubular-shaped wrapper are transferred to the end folders which operate to exteriorly engage the ends of one side of the wrapper and fold them against the ends of the article, then interiorly enter between the remaining wrapper sides and define the lines along which the remaining end folds are to be formed, and finally, by interiorly engaging the remaining wrapper sides, draw them to a folded condition along the lines which have been so defined, with the peaks of the end folds projecting beyond the package ends.
Labels which have been previously positioned and moistened are then affixed to the outer sides of the peaks of the end folds, and when the labels are so affixed, the peak folds are turned to a closed position against the package ends, so that the labels can be secured thereto to hold the wrapper in its folded condition, after which, means operate to press the labels thereto until the adhesion of the labels is assured.
For the purpose of explaining the principle of our apparatus its constructive details and mode of operation, we have in the following specification and drawings described and shown a machine suitable for bread-wrapping purposes; this being one of the essential uses and objects of our invention, but we wish it to be understood that a machine embodying the same mechanical principles, comprising essentially the same combination of parts which may be varied in their constructive details, and operated in substantially the same way, can be used for the wrapping of the same or other articles of merchandise, and that in the case of articles of relatively small size, it is possible to multiply the number of fold-forming parts and the timing of their operation to increase the wrapping capacity of the machine.

The present machine consists of several coördinate groups of parts which may be generally described as comprising: (*a*) the wrapper feeding and cutting mechanism, which continuously unwinds the wrapper from the wrapper roll, intermittently feeds it across the path of the article, and cuts it into desired wrapper lengths; (*b*) the elevator or feeding carriage, which receives the article to be wrapped from an intermittently-traveling conveyer and delivers it to the folding mechanism, this elevator or feeding carriage being provided with suitable wrapper grips which automatically engage the wrapper and hold it in its fixed relation to the article until delivered to the folding mechanism; (*c*) the side folders and actuating means, which operate to bring two sides of an unformed wrapper together and fold them lengthwise of their adjacent edges to form the wrapper to a tubular shape around the article; (*d*) the transfer carriage and its actuating means, which operate to deliver the article with its tubular-shaped wrapper from the side folders to the place where the end folds are formed; (*e*) the end folders, for defining the lines along which the end folds are to be made, and operating to draw the ends of the wrapper sides to their folded conditions along the lines so defined; (*f*) the label-feeding, moistening, affixing and cutting mechanism, which automatically position and affix the labels to the package ends to secure the end folds together; (*g*) the fold-turners and label-pressers, which operate as the end folders recede from the package ends to turn the peaks of the end folds to their closed position, the lines along which said peaks are turned being defined by suitable means provided for that purpose, the labels then being secured to the package ends by label-pressers which are operated to bear against the labels and press them tightly to the end folds; and (h) means for automatically stopping the action of the machine when the travel of the articles along the conveyer is discontinued, all of these coördinates being hereinafter described under corresponding sub-headings.

Figures 10, 11:
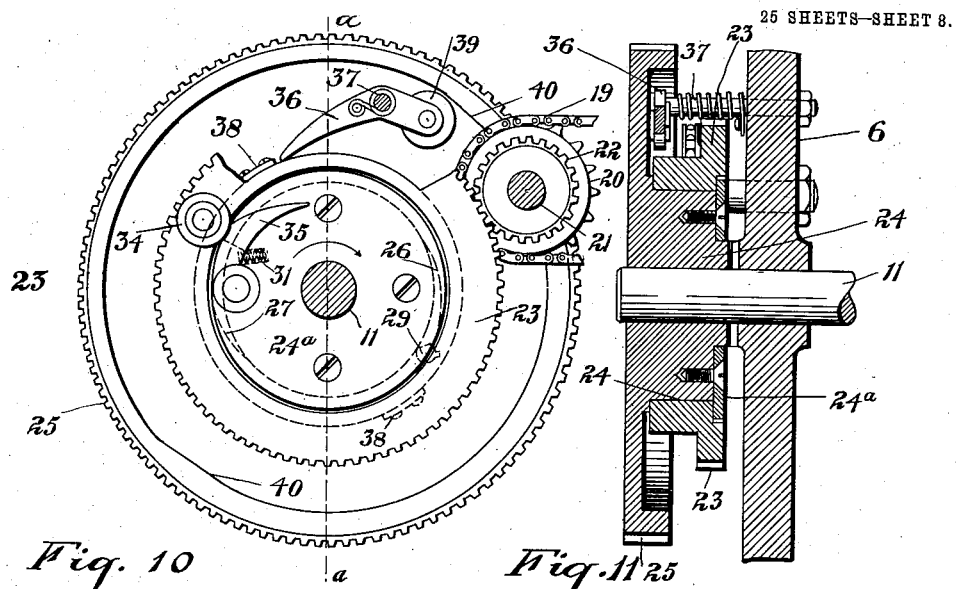
Figures 12, 13:
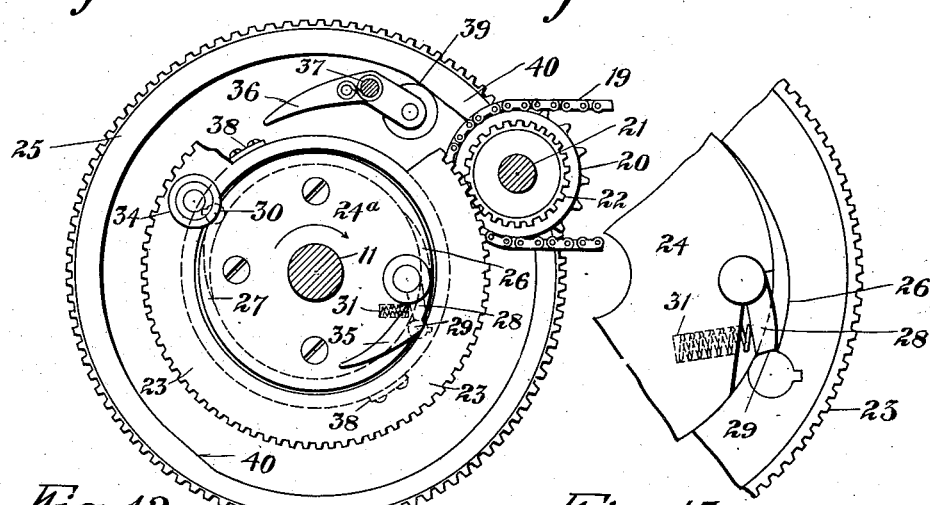
Figure 14:
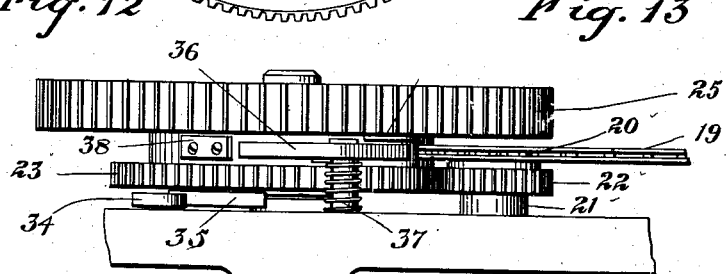
Figure 15:
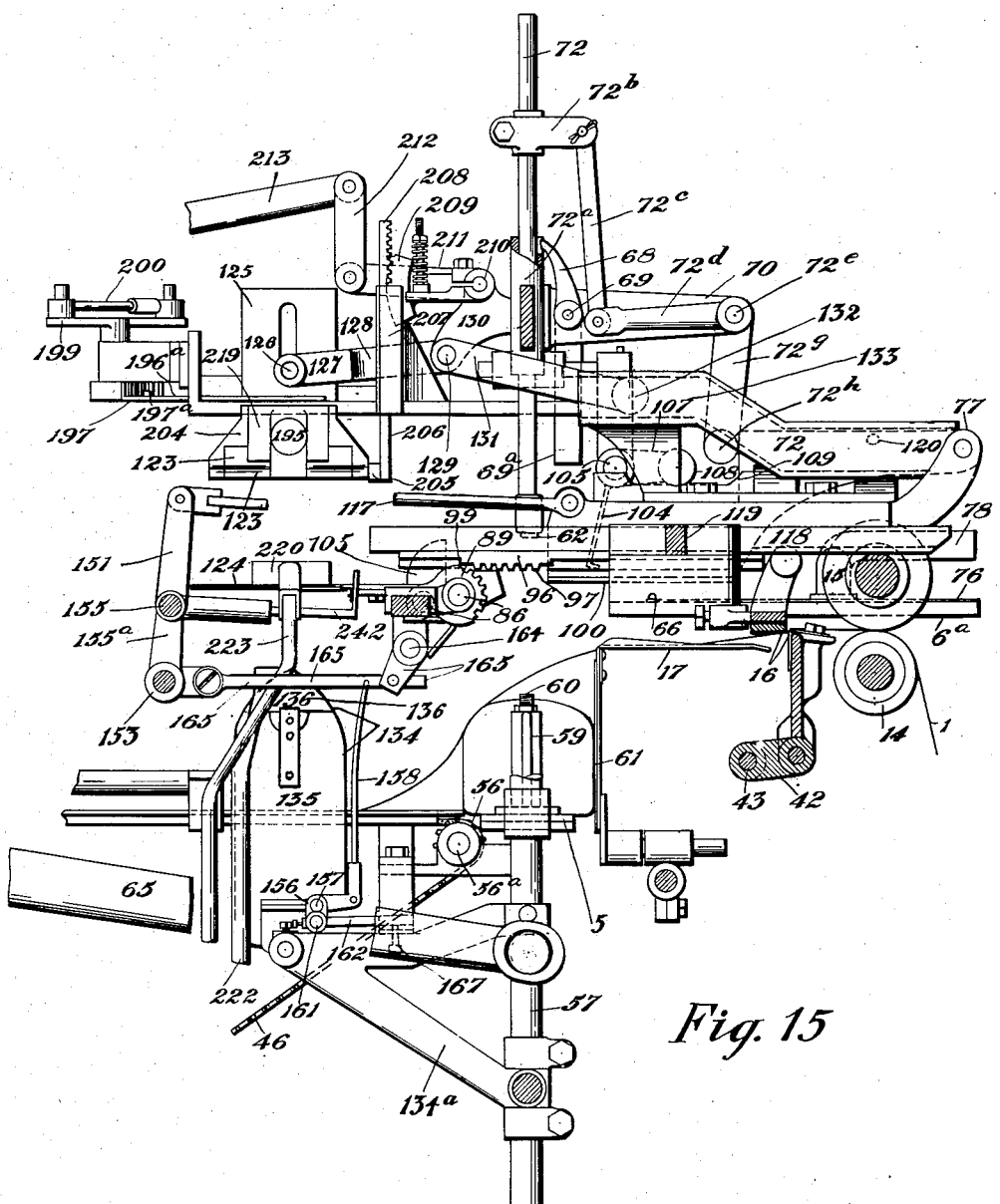
Figure 16:
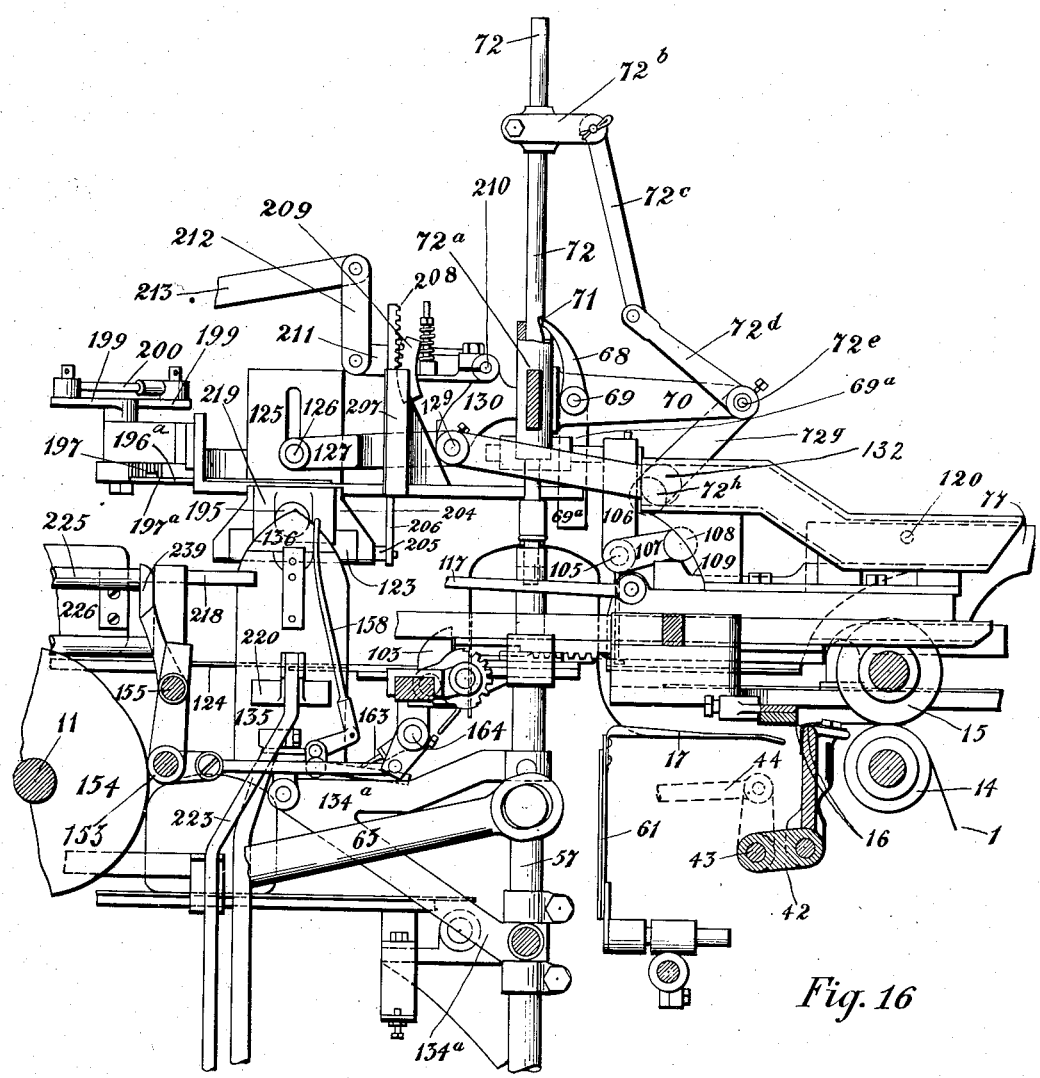
Figure 17:
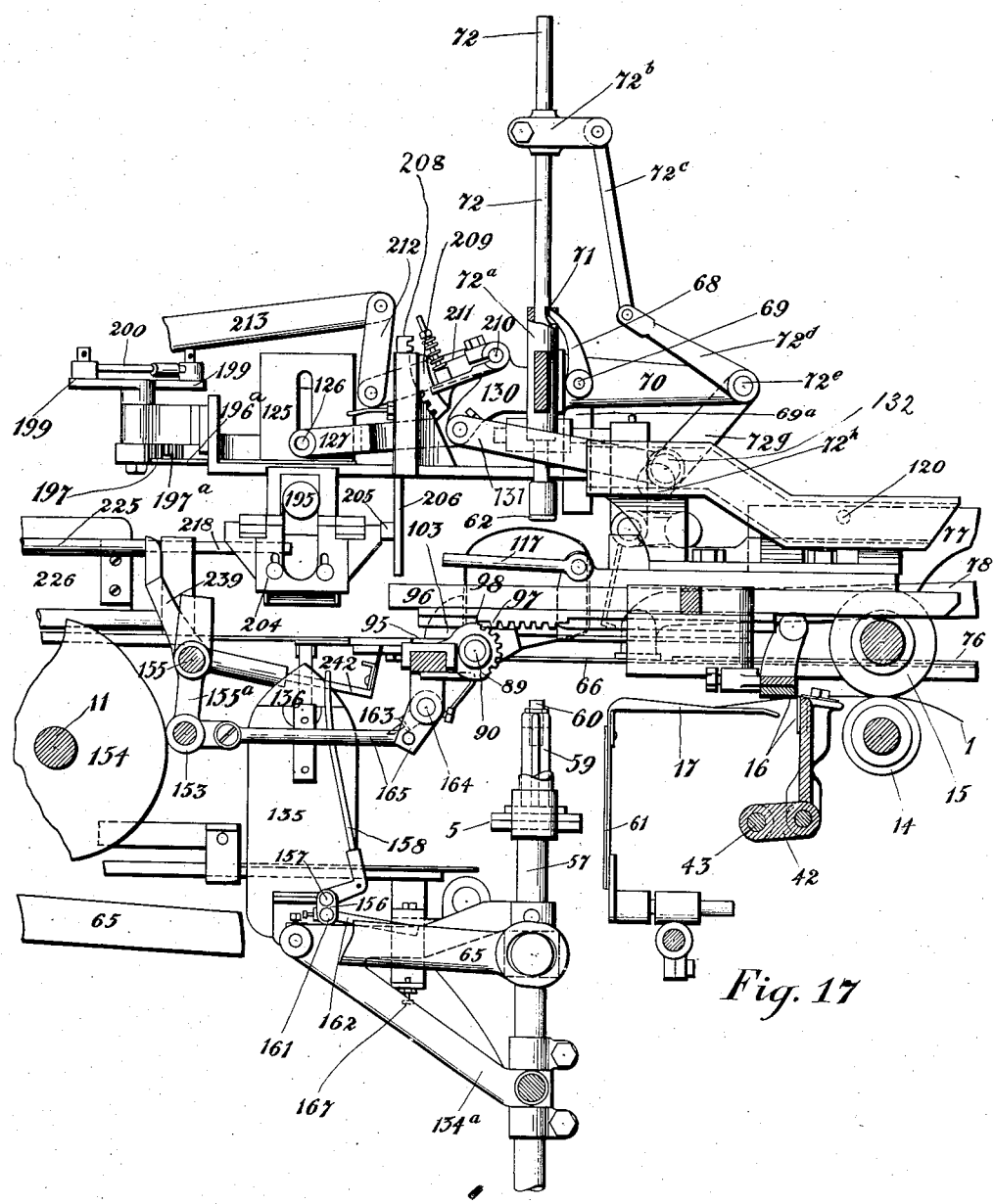
Figure 18:
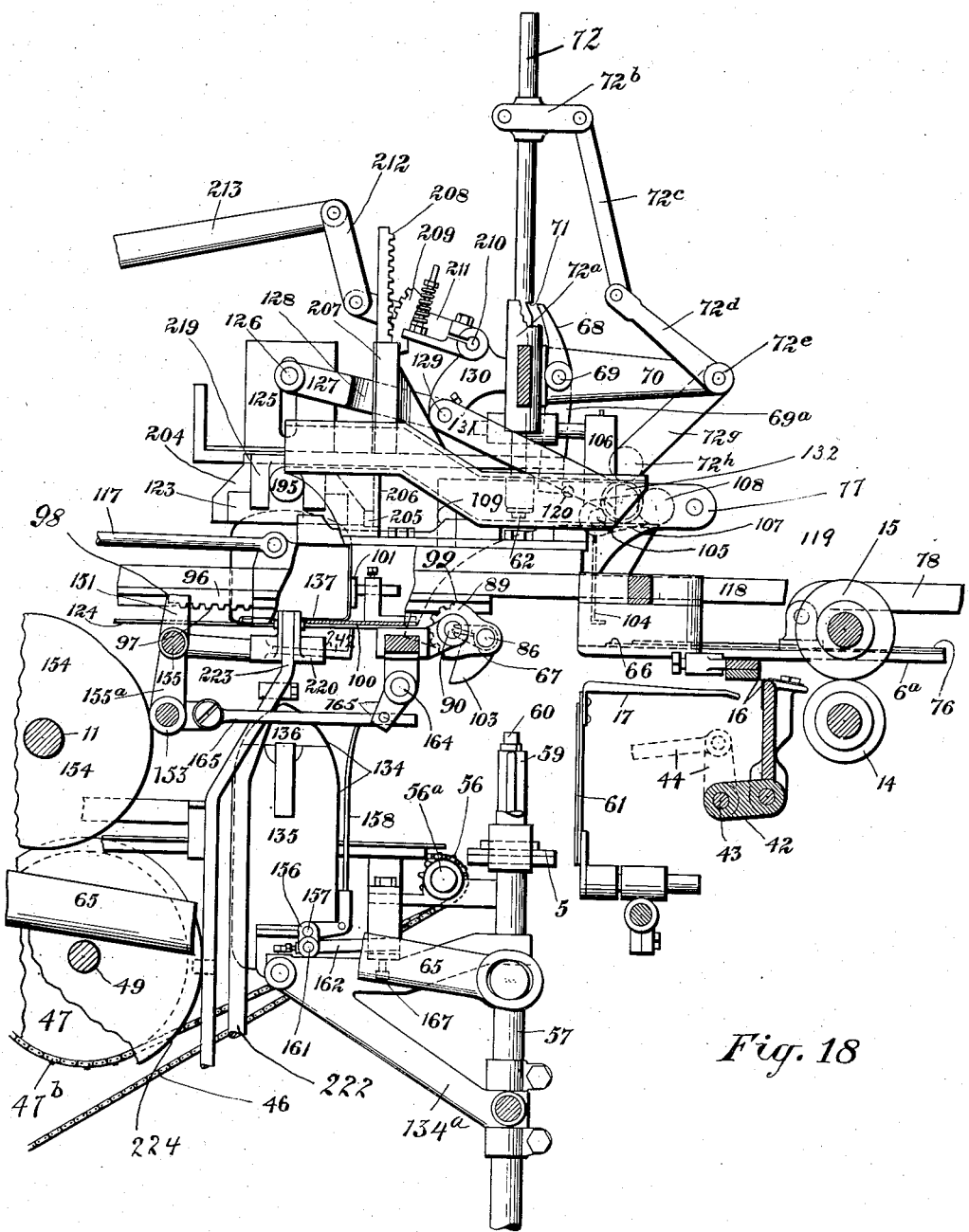
Figure 19:
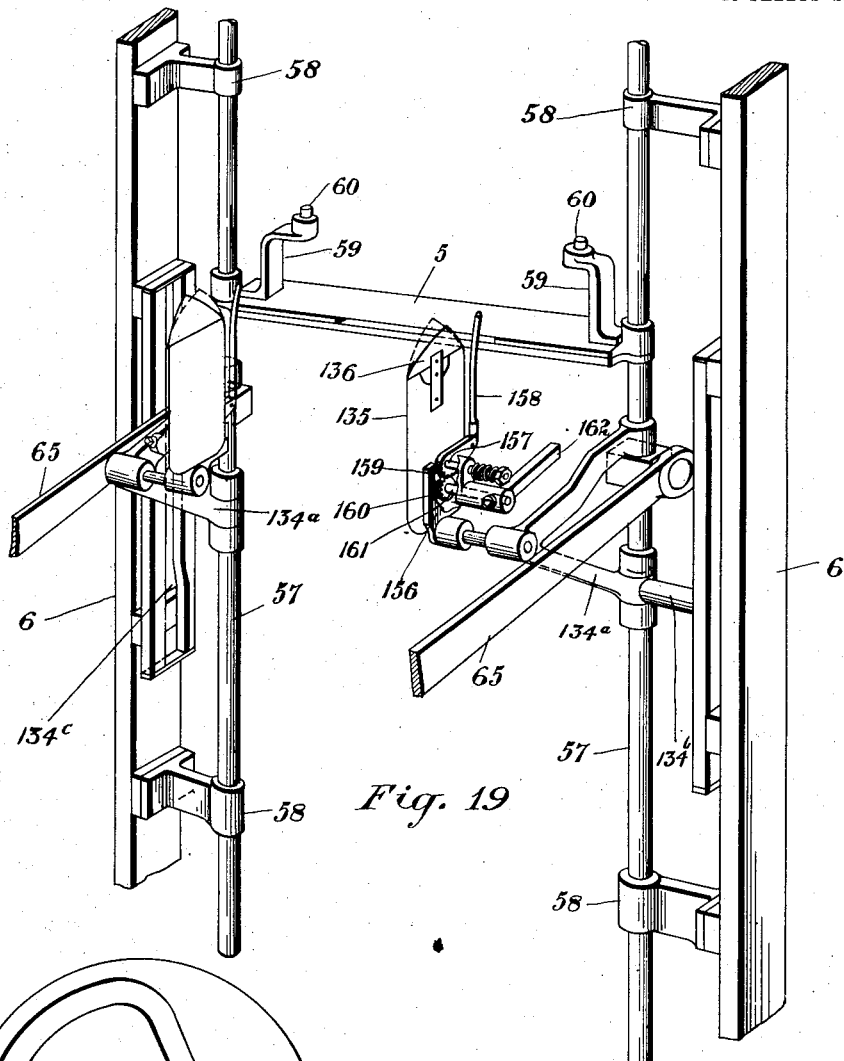
Figure 20:
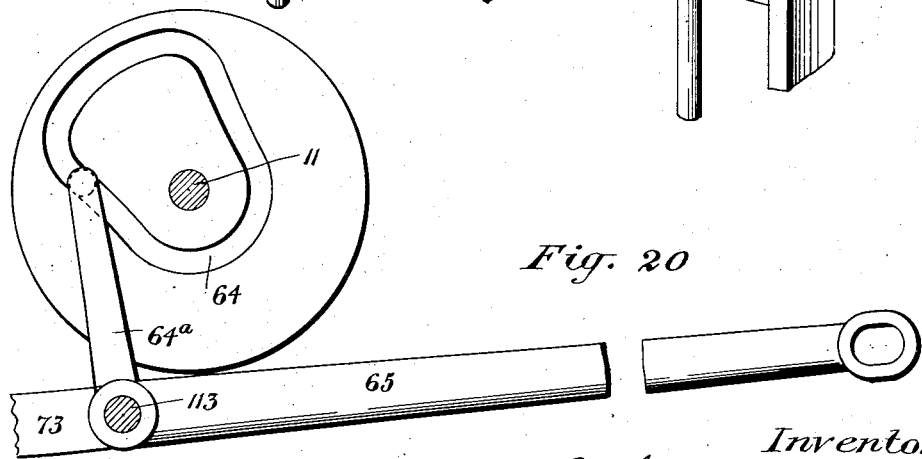
Figure 43:
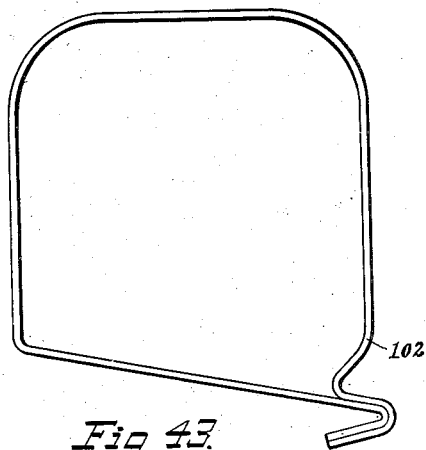
Figure 44:
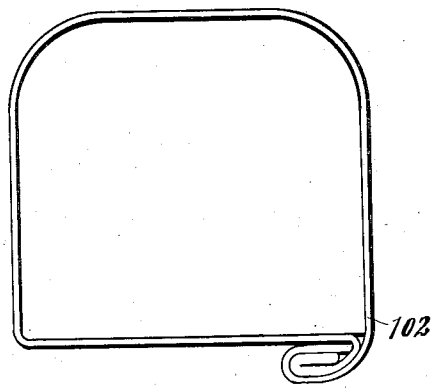
Figure 45:
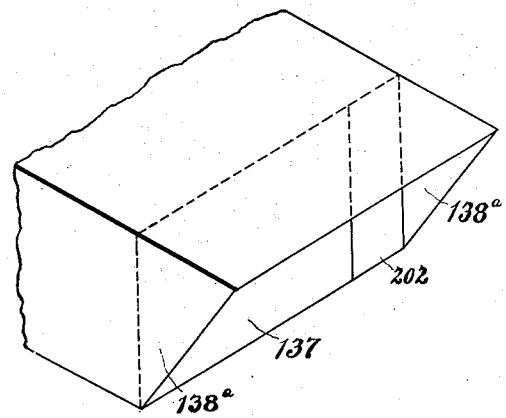
Figure 46:
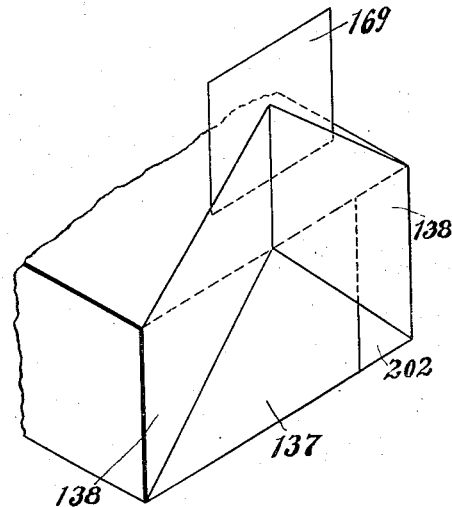

Figure 1, is a broken plan view of the wrapping machine showing the assembly of the parts, with the coördinate groups at their starting position; Fig. 2, is a side elevation of the wrapping machine looking at it from the right of Fig. 1; and Fig. 3, is a side elevation of the wrapping machine looking at it from the left of Fig. 1. Fig. 4, is a front elevation of the wrapping machine; Fig. 5, is a rear elevation of the wrapping machine; Fig. 6, is a plan view on a larger scale than in the preceding views, of the package presser, the peak turners, label pressers and the actuating means therefor; Fig. 7, is an elevation showing the main conveyer and cam shafts and their related parts, on the same scale as Fig. 6, looking at these parts from the rear of the machine; Fig. 8, is a broken elevation showing the means for transmitting motion from the main shaft to the conveyer sprocket wheel; Fig. 9, is a side elevation of the construction shown in Fig. 8; Fig. 10, is a broken side elevation of the means for transmitting an intermittent motion from the cam shaft to the intermittently rotating sprocket wheel from which the wrapper feed rolls are driven, with the detent dog positioned to prevent the over-run of the intermittently rotating spur wheel; Fig. 11, is a vertical section on the line a—a Fig. 10; Fig. 12, is a similar view to Fig. 10 showing the detent dog positioned to permit of the revolution of the intermittently rotating spur wheel and the driving dog in engagement with a driving shoulder; Fig. 13, is a broken detail view to show the engagement of the driving dog with a driving shoulder; Fig. 14, is a plan view of the construction shown in Figs. 10 and 12; Fig. 15, is a sectional detail view showing the position of the side and end folders, the presser and related parts prior to the elevator starting its ascending movement to the side folders; this being also the final position of the same parts; Fig. 16, is a similar view to Fig. 15 showing the position of the elevator, side and end folders and related parts when the elevator delivers the article and its wrapper to the side folders, this also being the position of the same parts during the formation of the end folds; Fig. 17, is a similar view to Figs. 15 and 16 showing the position of the parts when the elevator is receding to its starting position; Fig. 18, is a similar view to Figs. 15, 16 and 17, showing the position of the parts preparatory to their restoration to their starting position; Fig. 19, is a perspective view of the elevator and end folders; Fig. 20, is a detail view showing the cam and rock shaft which operate the levers for raising and lowering the elevator and end folders; Fig. 21, is a broken perspective view showing the transfer carriage, and the side folders, and their operating mechanism, the presser plate for opening the jaws of the oscillating folder being omitted in this view; Fig. 22, is a perspective view of the reciprocating side folder shown in Fig. 21; Fig. 22ª, is a perspective view of the presser plate which opens the jaws of the oscillating side folder when at the fold-forming position; Fig. 23, is a vertical section longitudinally through the transfer carriage and side folders showing the position of these parts when the elevator delivers the article and its wrapper to them; Fig. 24, is a similar view to Fig. 23, showing the position of the transfer table and side folders when the elevator is receding to the starting position shown in Fig. 15; Fig. 25, is a similar view to Figs. 23 and 24, showing the position of the side folders when the elevator has attained the position shown in Fig. 16, the side folders in this view having brought the opposed sides of the wrapper together and folded them along their adjacent edges; Fig. 26, is a similar view to Figs. 23 to 25 inclusive, showing the position of the side folders when the bottom fold is being in-turned against the wrapper side; Fig. 27, is a broken perspective view of the oscillating side folder with one of its Geneva gears removed; Figs. 28 and 28ª, are broken perspective views showing the presser blocks for the jaws of the oscillating side folder; Fig. 29, is a side elevation of the Geneva gear removed from Fig. 27; Fig. 30, is a sectional view showing the transfer table, and the side folders and the operating mechanism therefor; Fig. 31, is a sectional view showing the bracket supports for the transfer table; Fig. 32, is a front elevation partly in section of the label feeding and affixing mechanism, and the operating means therefor; Fig. 33, is a perspective view showing the label feeding rolls, the water reservoir, and the label severing shears and actuating means therefor; Fig. 34, is a front elevation of the label feeding and affixing mechanism shown in Fig. 33; Fig. 35, is a side elevation of the parts shown in Fig. 34; Fig. 36, is a vertical section on the line a—a Fig. 35; Fig. 36ª, is a sectional view showing the means for rotating the label-feeding and moistening rolls; Fig. 37, is an elevation showing the elevator, the end folders, the conveyer, the label pressers, the gravity trips for the end folders, and the means for imparting an intermittent motion to the conveyer; Fig. 38, is a rear elevation of the wrapper severing shears and the intermittent feed rolls; Fig. 39, is a vertical section on the line b—b Fig. 38, showing the means for operating the wrapper shears; Fig. 40, is a broken perspective view of the package supporting table and its related parts, showing the electrical circuit breaker for controlling the operation of the machine; Fig. 41, is a broken detail view illustrating the pivotal connection of the presser dog with the slide shown in Fig. 40; Fig. 42 is a detail view of one of the peak turners and its actuating means. Fig. 43 is a view of the wrapper showing the side fold when the side folders are in the position shown in Fig. 25. Fig. 44 is a similar view to Fig. 43, showing the formation of the side fold when the side folders are in the position shown in Fig. 26. Fig. 45 is a broken perspective view of a partly wrapped package, showing the bottom side of the wrapper closed against the end of the article. Fig. 46 is a broken perspective view of the partly wrapped article showing the formation of end folds before the peak is turned against the package end.

*Wrapper-feeding and cutting mechanism.* (See Figs. 1, 2, 3, 4, 5, 7, 10, 11, 12, 13, 14, 15, 16, 17, 18, 38, 39.)—During the operation of the machine, the wrapper 1 is unwound from the wrapper roll 2 by the continuous rotation of two feed rolls 3 and 4, between which the wrapper passes in its travel to the path of the elevator 5, the wrapper roll and feed rolls being suitably journaled to the main frame 6 and the elevator being vertically movable therein. Journaled to the main frame 6 is a sprocket wheel 7, from which motion is transmitted by intermeshing gear wheels 8 to the feed rolls 3 and 4, motion being transmitted to the sprocket wheel 7 by an endless sprocket chain 9 from a sprocket wheel 10 fixed on the cam shaft 11, see Figs. 1 and 2. The revolution of the cam shaft 11 is continuous, and through the medium of the sprocket wheels 10 and 7, sprocket chain 9, and intermeshing gear wheels 8, it causes the continuous revolution of the feed rolls 3 and 4, which during their revolution, continuously draw the wrapper 1 from the wrapper roll 2.

The wrapper 1, after clearing the feed rolls 3 and 4, passes under a tension bar 12 vertically movable in grooved standards 13, see Figs. 2 and 3, and then between two intermittently-rotating feed rolls 14 and 15, which deliver it through the shears 16 to the wrapper support 17 and across the path of the elevator 5, see Figs. 15, 16, 17 and 18. The tension bar 12 rises to the top of the standards 13 as the wrapper is carried forward by the intermittently-rotating feed rolls 14 and 15, and when the motion of these feed rolls ceases, it descends to the bottom of the grooved standards 13 to stretch out the slack in the wrapper created by the continuously-rotating feed rolls 3 and 4.

The feed roll 14 is provided with a sprocket wheel 18 driven by a sprocket chain 19 from a sprocket wheel 20 revolubly mounted on a stud 21 projecting from the main frame 6, the sprocket wheel 20 being rotated by a suitable gearing driven from the cam shaft 11. This gearing is shown in detail in Figs. 10 to 14 inclusive and may be described as consisting of a pinion 22 unitedly revoluble with the sprocket wheel 20 and meshing with an intermittently-revoluble spur wheel 23 loosely mounted upon the hub 24 of the spur wheel 25, being revolubly held thereon by a retaining plate 24ª. The bore of the spur wheel 23 has two eccentric recesses 26 and 27, to permit of the oscillating movement of the driving dog 28 when pressed into and out of engagement with the driving shoulders 29 and 30. These driving shoulders 29 and 30 are formed at the forward end of the eccentric recesses 26 and 27 respectively, so that the driving dog 28, which is pivoted within the hub 24, will, at the proper time, be pressed by a spring 31 into engagement with one of the driving shoulders.

The spur wheel 25 is fixed on the cam shaft 11 and meshes with the driving pinion 32 fixed on the main shaft 52, and is continuously revolved thereby. The hub 24 is an integral part of the spur wheel 25, and the driving dog 28 being pivoted in the hub and carried thereby, continuously revolves with the spur wheel 25.

Journaled to the main frame 6 is a roller 34 so positioned that when the spur wheel 25 revolves, it will engage a trip dog 35 connected with the driving dog 28, and by bearing against the trip dog 35, disengage the driving dog 28 from the then operative driving shoulder. When the driving dog 28 is so disengaged, the spur wheel 25 makes a semi-revolution to bring the driving dog 28 into operative relation with the next driving shoulder. In this way, the driving dog 28, during the revolution of the spur wheel 25, will carry the spur wheel 23 with it for a semi-revolution, then the driving dog 28 will be disengaged from the operative driving shoulder, and the spur wheel 25 will complete its revolution and bring the driving dog 28 into engagement with the other driving shoulder which, when so engaged, will rotate the spur wheel 23 the remaining semi-revolution to complete its cycle of motion, when the driving dog 28 will again be disengaged from the then operative driving shoulder. This action may be summarized by stating that it is possible to obtain an intermittent motion of the spur wheel 23 during the continuous motion of the spur wheel 25, and that it is possible to rotate the spur wheel 23 a semi-revolution unitedly with the spur wheel 25, and to permit it to remain idle while the spur wheel 25 completes its revolution.

Each semi-revolution of the spur wheel 23 feeds the desired length of wrapper across the path of the elevator 5, and to correctly determine each semi-revolution of the spur wheel 23, and consequently the desired length of wrapper fed across the path of the elevator 5, we have provided a spring-tensioned dog 36 pivoted on a stud 37 projecting from the main frame 6, and we have so arranged the point of the dog 36 that it will come into position with a shoulder 38 on the spur wheel 23, the spur wheel 23 being provided with two of these shoulders at diametrically opposite points, so that each shoulder will come into position with the dog 36 when the spur wheel has completed a semi-revolution. To lift the dog 36 into an inoperative position so that the shoulder 38 can clear it when the spur wheel 23 again starts its rotation, we provide the dog 36 with a roller 39 engaging a cam 40 on the spur wheel 25. The cam 40 has two raised surfaces which, as the spur wheel 25 rotates, successively engage the roller 39 and tilt the dog 36, at the commencement of each semi-revolution of the spur wheel 23, out of engagement with the shoulder 38.

When the spur wheel 23 is revolving, it rotates the pinion 22 and sprocket wheel 20 and causes the travel of the sprocket chain 19 and the rotation of the sprocket wheel 18 and feed roll 14.

The feed roll 15 is driven from the feed roll 14 by intermeshing gear 41, see Figs. 1 and 2, and during the intermittent rotation of the feed rolls 14 and 15, the desired length of wrapper is intermittently fed across the path of the elevator 5, this desired length of wrapper being taken from the slack resulting from the continuous feed previously described.

The path of the wrapper may be traced as follows: From the wrapper roll 2, the wrapper passes between the feed rolls 3 and 4, under the tension bar 12 and between the feed rolls 14 and 15. From the feed rolls 14 and 15, the wrapper passes between the blades of the shears 16 operated by a suitable link connection 42 from a rock shaft 43. The rock shaft 43 is oscillated by a crank, link and lever connection 44 from the cam 45 on the cam shaft 11, see Figs. 38 and 39, and this motion is so timed that the blades of the shears 16 are opened for the wrapper to feed across the path of the elevator 5 when the latter is receding to its normal position, and are closed to sever the wrapper when the elevator again starts on its upward course. The wrapper, after passing between the blades of the shears 16, passes across the wrapper support 17, which holds it above the top of the article being raised by the elevator, so that the article will carry the wrapper upward to the folding mechanism, the wrapper during its upward course, conforming by gravity to the top and two vertical sides of the article and projecting below the bottom thereof.

*Intermittent conveyer and actuating mechanism.* (See Figs. 1, 2, 3, 4, 7, 8, 9, 37, 40.)— Before the articles can be wrapped, it is necessary to convey them to the elevator 5, and for this purpose, we use a conveyer 46 which may be of any ordinary type, and preferably drive it from the sprocket wheel 47 fixed to a sleeve 48 on the conveyer drive shaft 49, see Figs. 7, 8, 9 and 37. Loosely mounted on the sleeve 48 is a spur wheel 50 meshing with a pinion 51 fixed on the main shaft 52, and pivoted to the side face of the spur wheel 50 is a spring-pressed dog 53 which engages with driving shoulders 54 on the sleeve 48, the driving shoulders 54 being diametrically opposite each other. The pinion 51 is provided with a roller 55 which engages the spring-pressed dog 53 at each revolution of the spur wheel 50 to disengage the spring-pressed dog 53 from the driving shoulder 54, with which it is for the time being in operative relation.

The revolution of the main shaft 52 is continuous, and this continuous revolution is imparted by the pinion 51 to the spur wheel 50. During the revolution of the spur wheel 50, the spring-pressed dog 53 comes into engagement with one of the driving shoulders 54 and causes a semi-revolution of the sleeve 48 and sprocket wheel 47, on the completion of which, the dog 53 is disengaged from the operative driving shoulder 54 by the roller 55, and the spur wheel 50 then moves a semi-revolution before the dog 53 comes into engagement with the next driving shoulder 54. In this way, the sprocket wheel 47 makes a semi-revolution with the main shaft 52, and then remains idle while the main shaft completes its revolution, thus causing a corresponding intermittent travel of the conveyer 46.

The conveyer 46 passes around two sprocket wheels 56 fixed on a counter shaft 56ª, journaled in the main frame 6, adjacent to the elevator 5, see Fig. 37. Fixed on the counter shaft 56ª is a sprocket wheel 47ª and passing around the sprocket wheels 47 and 47ª is a sprocket chain 47ᵇ by which the intermittent motion of the sprocket wheel 47 is transmitted to the counter-shaft 56ª and conveyer 46. The motion of the conveyer 46 is timed to harmonize with the motion of the elevator so that when the elevator comes to a position of rest at the completion of its downward movement, the conveyer will deliver an article to it and then remain stationary while the elevator is carrying the article and its wrapper to the folding mechanism and returning again to its starting position.

The elevator 5 when at its starting position, receives the articles from the conveyer 46, the location of the articles on the elevator being determined by a stopping plate 61 forming part of the wrapper support 17, see Figs. 15, 16, 17 and 18. When the conveyer has delivered an article to the elevator 5, the cam 64 fixed on the cam shaft 11 revolves, and by means of a crank 64ª oscillates the rock shaft 113 to which are fixed the levers 65, this oscillation of the rock shaft 113 causing the levers 65 to raise the elevator toward the side folders 66, 67, see Figs. 19 and 20.

*The elevator or feeding carriage.* (See Figs. 1, 2, 3, 4, 15, 16, 17, 18, 19, 20 and 37.)—The elevator 5 is connected to two guide rods 57 vertically movable through guide collars 58 conveniently secured to the main frame 6, and to these guide rods 57 are connected the levers 65 which raise and lower the elevator during its movements. At the sides of the elevator 5 are upright arms 59 provided with adjustable wrapper grips 60, these wrapper grips being slightly above the top of the article to be wrapped.

When the elevator is at its starting position, the wrapper grips 60 are below the level of the wrapper lying across the path of the elevator so that when the elevator starts its upward movement, these wrapper grips will come into contact with the wrapper and carry it upward toward the side folders 66, 67, see Fig. 15. As the elevator rises, the lower wrapper grips 60 come into contact with the upper wrapper grips 62, which are located at the lower ends of the upper wrapper grip rods 72, which co-act with the lower wrapper grips to securely hold the wrapper in its set position until the elevator has attained its limit of motion and starts to recede to its starting position, see Fig. 16.

When the elevator has attained its limit of motion, the lower wrapper grips will have pushed the upper wrapper grip rods 72 to their elevated position, in which they are held by dogs 68 fixed on a spring tensioned rock shaft 69 journaled in arms 70 connected with the guide collars 72ª fixed to the main frame 6, the dogs 68 for that purpose engaging in notches 71 in the upper wrapper grip rods 72, the rock shaft 69 being provided with a crank 69ª for the release of the dogs from said notches, see Fig. 16.

When the elevator recedes to its normal position, and the lower wrapper grips 60 have descended below the level of the top of the article, the wrapper comes into contact with it, there being a slight clearance between the wrapper and the under-side of the upper wrapper grips 62 for the lateral movement of the article and its wrapper when being transferred to the position where the end folds will be formed, see Fig. 17.

The upper wrapper grip rods 72 are movable in the guide collars 72ª, and are provided with brackets 72ᵇ connected by links 72ᶜ with the levers 72ᵈ fixed on a rock shaft 72ᵉ journaled in the arms 70. The rock shaft 72ᵉ is provided with a crank 72ᵍ having a roller 72ʰ to engage the top of one side 77ᵉ of the transfer carriage 77 when the dogs 68 are disengaged from the notches 71. When the dogs are engaged in the notches, there is a slight clearance between the roller 72ʰ and the top of the transfer carriage 77, so that the transfer carriage can move from its starting position to its limit of motion when transferring the partly-wrapped article to the end folders, without disturbing the position of the upper wrapper grip rods 72. This clearance insures the dogs 68 remaining in the notches of the upper wrapper grip rods and holding them in their elevated position until the partly-wrapped article is entirely clear of them, so that the upper wrapper grips will not, during the transfer of the article from the side folders to the end folders, come into contact with the wrapper and disarrange its formation around the article.

When the partly-wrapped article has been delivered to the end-folding mechanism, the pin 120 connected to the transfer carriage 77 engages the crank 69ª and rocking the shaft 69, disengages the dogs 68 from the notches 71. When the dogs are disengaged from the notches 71, the upper wrapper grip rods 72 descend through the guide collars 72ª until the roller 72ʰ engages the top 77ᵉ of the transfer carriage 77, when the further downward movement of the upper wrapper grip rods is arrested until the transfer carriage is nearing the completion of its receding movement, see Fig. 3.

The movement of the elevator from its starting position to the delivery of the article and its wrapper, above the side folders 66, 67, and the return again of the elevator to its starting position, takes place during the revolution of the cam 64. To relieve the cam 64 of part of its effort in raising the elevator from its starting position, we have provided the rock shaft 113 with levers 73 and have fitted them with counterbalances 75 to equalize the weight of the elevator, its load, and its related parts, see Figs. 2, 3, 19 and 20.

During the ascending movement of the elevator, the wrapper, by its own weight, loosely conforms to three sides of the article, and when the article is pushed between the side folders 66, 67, two opposed wrapper sides hang below the bottom of the article to be subsequently engaged by the side folders.

*Side folders.* See Figs. 15, 16, 17, 18, 21, 22, 23, 24, 25, 26, 27, 28, 28ª, 29 and 30.—
The side folders 66 and 67 are located on opposite sides of the path of the elevator 5, and the side folder 66 is movable in a slideway 76 formed in the plate 6ª, fixed to the main frame 6 below the bottom 100 of the transfer carriage 77, and consists essentially of a flat T-shaped plate having a link 78 pivotally connected to a lever 79 fixed on the rock shaft 80, see Figs. 21 and 22. The rock shaft 80 is suitably journaled in the main frame 6 and is provided with a crank 81 connected by a link 82 with a pivoted lever 83ª actuated by a cam 83 on the cam shaft 11, the cam 83 being so timed as to cause the forward movement of the folder 66, across the path of the elevator when the elevator and its related parts have receded below the level of the side folder 66, see Fig. 21.

The folder 67 consists of two spring-tensioned jaws 84 and 85 loosely mounted upon a hinge pin 86 so that they can close together as they move from their fold-forming to their fold-delivering position, see Fig. 27. At one end of the jaw 84 is a presser block 87, and at the opposite end of the jaw 85 is a presser block 88, the presser blocks being employed to open the jaws and hold them in their open position to receive the ends of the wrapper for the formation of the side fold, and to subsequently release the side fold for the movement of the partly-wrapped article to the end folders, see Figs. 28 and 28ª.

The hinge pin 86 is mounted in the Geneva gears 89 and 89ª, and these Geneva gears are provided with studs 90 journaled in the main frame 6, so that they can oscillate between the fold-forming and fold-delivering positions of the jaws 84 and 85, see Figs. 27 and 29. The presser block 87 is provided with a pin 91 contained in a slot 92 in the Geneva gear 89, and the presser block 88 is provided with a pin 93 contained in a slot 94 in the Geneva gear 89ª, the slots 92 and 94 being so arranged as to permit of the free ends of the jaws 84 and 85 coming together when the presser blocks are relieved of their jaw-opening pressure, the inner ends of the slots 92 and 94 preventing the pins passing their central position, so that when either of the presser blocks is engaged, its respective jaw will move to an open position and the other jaw will be prevented from following it.

Rigidly secured to the main frame 6 is a presser plate 95 which engages the presser block 87, when the folder 67 is in its fold-forming position, and depresses it to force the jaw 84 away from the jaw 85, so that the folder 66 and the wrapper ends can enter therein, see Figs. 23, 24 and 25.

When the elevator and its related parts have receded below the level of the side folder 66, the cam 83, by means of the lever 83ª, link 82, crank 81, rock shaft 80, lever 79, and link 78, moves the folder 66 across the path of the elevator into operative relation with the folder 67, and causes it to enter between the jaws 84 and 85, see Fig. 25, and then retracts it therefrom before the transfer carriage 77 commences its movement to shift the article and its wrapper to the end folders.

As the side folder 66 moves toward the side folder 67, it first engages the adjacent downhanging side of the wrapper and pushes it across the bottom of the article and then brings it into engagement with the downhanging end of the opposed side, and then pushes both of the downhanging ends into the separated jaws 84 and 85 of the folder 67, and by doing so, forms the adjacent edges of the two opposed wrapper sides into a fold 102 lengthwise of the bottom, and at the same time, draws the wrapper tightly around the four sides of the article and forms the wrapper to a tubular shape. The folder 66 then recedes quickly from between the jaws 84 and 85 and leaves the folded ends of the wrapper therein. The transfer carriage 77 then moves across the path of the elevator to deliver the partly-wrapped article to the end folders, see Fig. 26.

Movable with the transfer carriage 77 are two rack bars 96 having rack teeth 97 to engage with the teeth of the Geneva gears 89, 89ª and oscillate them a semi-revolution as the transfer carriage completes its travel across the elevator path. The rack bars 96 have shoulders 98 which engage corresponding shoulders 99 on the Geneva gears 89, 89ª to rotate the Geneva gears until their teeth intermesh with the teeth of the rack bars. The meshing of the teeth of the rack bars with those of the Geneva gears causes the Geneva gears to oscillate on their studs 90, the oscillating movement of the Geneva gears being sufficient only to move the folder 67 from its fold-forming position, as shown in Figs. 23, 24 and 25, to its fold-delivering position, as shown in Fig. 26. As the folder 67 oscillates with the Geneva gears 89, 89ª, it releases the presser block 87 from the presser plate 95, and by doing so, enables the jaw 84, to close against the jaw 85 and tightly grip the folded ends of the wrapper to hold them in their folded condition. During its oscillation, the folder 67 inturns the folded wrapper ends against the adjacent wrapper side, and by doing so, doubles the interlocking fold 102 lengthwise of the wrapper, as shown in Fig. 44, when the folder comes into its fold-delivering position. While the folder 67 is moving from its fold-forming to its fold-delivering position, the transfer carriage is moving across the elevator path, and when at the fold-delivering position, the bottom 100 of the transfer carriage 77 engages the presser block 88 which is then uppermost, as shown in Fig. 26, and by forcing the presser block downward, separates the jaw 85 from the jaw 84, so that the fold can be withdrawn from the folder 67 without its formation being impaired.

The transfer carriage 77 is provided with a set of adjustable pushers 101 which engage the adjacent wrapper side and push the partly-wrapped article from the side folders to the end folders, see Fig. 21. Simultaneously with the pushers 101 coming into contact with the adjacent wrapper side, the carriage bottom 100 enters between the jaw 85 of the folder 67 and the wrapper bottom, see Fig. 26, so that the further movement of the transfer carriage will cause the pushers to bear against the adjacent side of the wrapper and cause the carriage bottom 100 to push against the bottom fold 102 and insure the delivery of the bottom fold from the folder 67 when the partly-wrapped article commences its movement toward the end folders. The transfer carriage continues its movement to its limit of motion, and then recedes to its starting position. During the receding movement of the transfer carriage, the teeth 97 of the rack bars 96 again engage the Geneva gears 89, 89ª and oscillate them to restore the folder 67 to its fold-forming position for the succeeding operation of the machine.

Connected to the jaw 85 are stopping fingers 103 which extend into the path of the article and its wrapper, as shown in Figs. 23, 24 and 25, the presser plate 95 being slotted for the movement of the stopping fingers as they oscillate with the folder 67, as shown in Fig. 22ª. During the oscillation of the folder 67, these stopping fingers 103 tumble from a position in the path of the article to a position below the same, as the folder turns with the Geneva gears, as shown in Fig. 26, so that these stopping fingers will be entirely clear of the path of the article during its advance to the end folders under the influence of the pushers 101. Opposed to the stopping fingers 103 on the opposite side of the path of the elevator 5 is a spring-tensioned support 104 mounted on a shaft 105 journaled in arms 106 connected with the guide collars 72ª, and fixedly connected to the shaft 105 is a crank 107 having a roller 108 to engage with a cam 109 on the transfer carriage 77, the cam being so timed that when the transfer carriage is at its normal position, it will raise the crank 107 and relieve the article and its wrapper of the pressure of the spring-tensioned support 104 until the elevator starts its receding movement, as shown in Fig. 23.

When the elevator starts its receding movement, the transfer carriage 77 moves a short distance in the direction of the elevator path and the carriage bottom 100 passes slightly below the article and wrapper to support them in their elevated position, as shown in Fig. 24. The transfer carriage then halts and remains halted until the folder 66 has moved across the elevator path and pushed the ends of the opposed wrapper sides into the jaws 84 and 85, as shown in Fig. 25, and receded therefrom. The transfer carriage then continues its journey to deliver the partly-wrapped article to the end folding mechanism.

When the transfer carriage is moving from its starting position to its halted position, the roller 108 descends from the highest part of the cam 109, as shown in Fig. 23, to the lowest part of the cam 109, as shown in Fig. 24, and during this movement, it rocks the shaft 105 and causes the spring-tensioned support 104 to move the article and wrapper against the stopping fingers 103, pressing it against these fingers to securely hold the article and wrapper while the bottom fold is being made. Upon the completion of the bottom fold, the roller 108 commences its ascent of the cam 109, and raising the crank 107, rocks the shaft 105 to disengage the spring-tensioned support 104 from the article and wrapper, and thus relieve the latter from the pressure of said support.

*Transfer carriage.* (See Figs. 1, 2, 3, 5, 15, 16, 17, 18, 21, 23, 24, 25, 26, 30, 31.)—It has been stated that the transfer carriage 77 moves to deliver the partly-wrapped article from the side folders to the end folders, and we will now describe the means by which the transfer carriage is actuated.

On the cam shaft 11 is a cam 110 engaging a roller 111 journaled on the lever 112 fulcrumed on the rock shaft 113, see Fig. 30, and this cam 110, as it revolves, rocks the lever 112 between the positions shown in full and dotted lines in Fig. 30. Keyed on the rock shaft 231 are levers 114, one of which has a link connection 115 with the lever 112, whereby the rock shaft 231 is oscillated from the rock shaft 113. To vary the movement of the lever 114, we have formed in it a slot 116, and we have provided the link 115 with a suitable adjustment therein. When the link 115 is connected to the lever 114 at the upper end of the slot 116, we obtain the maximum of movement of the lever 114, and when at the lower end of the slot, we obtain the minimum of movement.

The transfer carriage 77 is connected to the levers 114 by adjustable links 117 which move the transfer carriage from its starting position to its limit of motion and return it again to its starting position during the oscillation of the rock shaft 113, the transfer carriage moving on slideways 118 connected by brackets 119 to the main frame 6, the slideways 118 being so positioned at the sides of the main frame as not to interfere with the action of any of the other moving parts of the machine.

When the upper wrapper grips 62 are raised to their limit of motion, the dogs 68 engage in the notches 71 and hold the upper wrapper grip rods 72 in their elevated position, see Fig. 16, until the pin 120 comes into contact with the crank 69ª during the forward movement of the transfer carriage, and rocks the shaft 69 to disengage the dogs 68 from the notches 71 and release the upper wrapper grip rods 72 for their return to a normal position.

During the receding movement of the transfer carriage, its top side engages the roller 72ʰ, see Fig. 3, to hold the upper wrapper grip rods 72 in their elevated position until the recessed part 77ª of the transfer carriage comes into position with the roller 72ʰ. The roller 72ʰ then passes over the corner indicated at 77ᵇ and descends along the front edge of the recessed part 77ª and permits the upper wrapper grip rods to return to their lowered position, the purpose of this construction being to restore the upper wrapper grip rods to their lowered position without unnecessary noise or jar.

The above described operation of the side folders 66, 67 and the transfer carriage 77 may be briefly summarized as follows:— When the side folder 66 has been advanced across the path of the elevator 5, to press the adjacent edges of the opposed sides of the wrapper into the jaws 84, 85 and has receded therefrom, the cam 110 operates to advance the transfer carriage across the path of the elevator 5. During the advance of the transfer carriage, the shoulders 98 on the rack bars 96 engage the shoulders 99 on the Geneva gears 89, 89ª and slightly oscillate them so that their teeth will engage with the teeth of the rack bars. The continued movement of the transfer carriage and rack bars turns the Geneva gears 89, 89ª from the fold-forming position of the folder 67 to its fold-delivering position, the rack teeth 97 then disengaging the teeth of the Geneva gears 89, 89ª while the transfer carriage continues its journey to bring the partly-wrapped article into position with the end folders, the transfer carriage being provided with adjustable pushers 101 which engage the article and insure its movement with the carriage.

To retain the side folder 67 in its fold-delivering position, the Geneva gears are provided with side pieces 122 engaged by the rack bars when the rack teeth are disengaged from the teeth of the Geneva gears, these side pieces 122 having a double face whereby they are also engaged by the rack bars when the side folder 67 is in its fold-forming position, see Fig. 29.

When the transfer carriage has moved the partly-wrapped article from the side folders to the end-folding mechanism, a presser 123 engages it and clamps it tightly against a table 124 to securely hold the wrapper in its tubular shape until the formation of the end folds is completed, see Figs. 15, 16 and 17.

*The presser.* (See Figs. 1, 4, 6, 15, 16, 17, 18, 32.)—The presser 123 is vertically movable in a guideway 125, the sides of which are slotted for the movement of the trunnions 126 projecting from the presser 123. The trunnions 126 are mounted in the forks 127 of an arm 128 fixed on a rock shaft 129 journaled in brackets 130 secured to the guide collars 72ª, see Figs. 6, 15, 16, 17 and 18. Fixed to the rock shaft 129 is an arm 131 having a roller 132 movable in a cam 133 fixed to, or forming part of the transfer carriage 77, the cam 133 being so timed that when the transfer carriage is moving to deliver the partly-wrapped article from the side folders to the end-folding mechanism, the presser 123 will ascend to an elevated position clear of the path of the article and its wrapper, see Fig. 18, it being necessary that the presser should assume this position so that the transfer of the partly-wrapped article to the end-folding mechanism may not be impeded.

When the transfer carriage has effected the delivery of the partly-wrapped article to the end-folding mechanism, the cam 133 actuates the arms 131 and 128 to lower the presser 123 into contact with the top of the article and clamp it tightly against the table 124 to securely hold the partly-wrapped article while the end folders are performing their function, the presser remaining in contact with the wrapper and article until the transfer carriage again moves from its starting position to push the next succeeding article to the end folders, see Figs. 15, 16 and 17. When the transfer carriage has completed about one-fourth of its movement toward the end folders on the succeeding action of the machine, the presser 123 rises to its elevated position and releases the previously-wrapped article so that the next article being delivered from the side folders to the end folders will push it into the delivery chute.

When the presser 123 is lowered into a position to engage the partly-wrapped article, the end folders 134 rise with the elevator and complete, in a single movement of the machine, the formation of all the end folds and prepare the peaks of the end folds to receive the labels which seal the ends of the package.

*The end folders.* (See Figs. 2, 3, 15, 16, 17, 18, 19, 20, 30, and 37.)—Before the end folders 134 operate to form the end folds, the wrapper is of a tubular shape conforming to the top, bottom, and vertical sides of the article, and projecting beyond its ends sufficiently to provide for the formation of the end folds, the wrapper having been brought to this shape by the side folders 66 and 67. The end folders 134 straddle the conveyer 46 when at their lowered position and in this position it is necessary to have a maximum of clearance between the inner faces of the folders so that the articles passing along the conveyer will not come into contact with them, but when the folders are at their elevated position for the formation of the end folds, it is necessary that they should tightly embrace the ends of the article, and for this reason, there should be a minimum of clearance between their inner faces. For this reason the end folders 134 are supported by bracket arms 134$^a$ oscillatingly fixed on the guide rods 57. These bracket arms 134$^a$ are provided with rollers 134$^b$ movable in cams 134$^c$ fixed to the main frame 6. The cams 134$^c$ are so formed that the end folders will oscillate toward each other as they rise with the elevator, and will oscillate from each other as they descend with the elevator, the purpose of this oscillation being to increase the clearance between the inner faces of the end folders when they are at their lowered position, and to decrease the clearance between them at their fold-forming position. The end folders 134, which move in unison with the elevator 5, rise with it as it lifts the next article and its wrapper to the side folders, and these end folders come into contact with the projecting ends of the tubular-shaped wrapper of the previous article and fold them to lie smoothly and evenly against the ends of the wrapped package. These end folders have been particularly designed for use in connection with a wrapping machine in which the articles to be wrapped may be of uniform or non-uniform shape, and are the result of a series of exhaustive experiments with regard to the formation of the end folds of a wrapper containing an irregularly-shaped article.

During the course of our experiments, we discovered that it was necessary to construct and arrange the end folders so that they would exteriorly engage and fold the ends of one side of the wrapper and then interiorly engage the ends and support the remaining sides of the wrapper during the formation of the remainder of the end folds, and during such interior engagement, define the lines along which said folds are to be formed.

The details of the construction of the end folders may be varied in different classes of machines for the wrapping of different kinds of articles, but the broad principle upon which the end folders operate is that each end folder consists of a plural number of parts which, in a contracted condition, engage the wrapper so that one of the folder parts may exteriorly engage and press one of the wrapper sides to the end of the article and then enter interiorly of its remaining sides to define the lines of the remainder of the end folds, the other part or parts of said folder then being expanded to exteriorly engage the remaining wrapper sides and draw them to a folded condition along the lines defined for the folds.

When the end folder comes into operative relation with the wrapper, the rectangular element 135 exteriorly engages the end of the bottom wrapper side 137 and folds it to lie evenly against the end of the article and substantially parallel with the edges thereof, and at the same time that it performs this function, it also tucks in the lower half of the vertical wrapper sides 138. The fold-forming element 135 then enters the wrapper interiorly of its remaining sides and rises until its top edge is approximately opposite the top edge of the article, the fold-forming element 136 at this time occupying a position in angular relation to the fold-forming element 135. When the fold-forming element 135 has entered fully within the remaining sides of the wrapper, it defines the lines along which the remaining folds will be formed, i. e. it defines the lines for the folding of the vertical and the top sides of the wrapper. Thus when the top edge of the fold-forming element 135 is opposite to the top of the article, what was previously the projecting end of the bottom side of the wrapper, lies evenly and smoothly against the ends of the article, and the vertical sides of the wrapper are of a substantially triangular shape and the top side of the wrapper is substantially flat, and it is when the top edge of the fold-forming element is level with the top of the article that the fold-forming element 136 is moved into a vertical position.

When the fold-forming element 136 assumes a vertical position, it presses against the inner side of the top of the wrapper, and bending said top side of the wrapper into a vertical plane, forms it to a triangular shape and draws what was previously the top halves of the vertical sides of the wrapper, tightly across the ends of the article, the several parts of the end folders being interiorly located with respect to the folds of the wrapper ends, and are withdrawn therefrom as hereinafter described without disturbing the fold formation. When the fold-forming element 136 has attained its limit of movement, the end fold is completely shaped with the peak 139 of the fold projecting beyond the top side of the package and ready to be turned against the end and sealed thereto.

It is owing to the frangible character of the wrapper, that we find it advisable to construct each of the end folders of two parts 135 and 136, so that the fold-forming element 136 will engage the wrapper at approximately an angle of 30° from the perpendicular and then straighten out into a perpendicular position.

The fold-forming elements 136 are brought into the same plane as the fold-forming elements 135 by rollers 147 journaled in spring-tensioned forks 148 hinged to arms 149 rockably connected to the main frame 6. The arms 149 are provided with cranks 150 connected with spring-tensioned levers 151 by universal couplings 152. The levers 151 are fixed on a rock shaft 155 having a crank 155$^a$ provided with a roller 153 engaging with a cam 154 on the cam shaft 11. The levers 151 being fixed on the rock shaft 155 are simultaneously operated to bring the rollers 147 into engagement with the peak folds formed by the fold-forming elements 136 coincidentally when the end folders rise to their elevated position, the action of the rollers 147 being timed to cause them to engage the peak folds until the end folders have been withdrawn.

Fastened to each of the fold-forming elements 135 is a bracket 156, and journaled in each of the brackets 156 is a rock shaft 157 provided with an oscillating member 158. Each oscillating member 158 is provided with a segmental pinion 159 which meshes with a segmental pinion 160 on a rock shaft 161. Each rock shaft 161 is provided with a crank 162, and these cranks 162, as the end folders attain their limit of movement in the upward direction, are engaged by fingers 163 fixed on a rock shaft 164 operated from the roller 153 by a crank and link connection 165 as the cam 154 revolves with the cam shaft 11. See Figs. 15, 16, 17 and 18.

The purpose of the oscillating members 158 is to maintain the fold-forming elements 136 in the same plane as the fold-forming elements 135 so that the fold-forming elements 136 will not, by any inadvertence, impair the formation of the end folds during their withdrawal therefrom, the oscillating members 158 maintaining the fold-forming elements 136 in the same plane as the fold-forming elements 135 until the folders have been fully withdrawn from the folded wrapper ends during the receiving movement of the end folders to their starting position. When the end folders have reached their starting position, adjustable pins 167 engage the cranks 162 and, by elevating them, cause the oscillation of the rock shafts 161, segmental pinions 159 and 160, and rock shafts 157, to restore the oscillating members 158 to an inoperative position, so that the fold-forming elements 136 can assume their angular relation to the fold-forming elements 135, the fold-forming elements 136 being restored to their angular position by gravity trips 168 pivoted beneath the package supporting table 124.

The above description may be briefly summarized as follows:—By making each end folder of two or more fold-forming elements movable into a contracted position when the folders come into operative relation with the wrapper ends, it is possible for the end folders to exteriorly engage the ends of one side of the wrapper and fold them to the article to lie evenly against the end of the article and then interiorly engage the ends of the remaining sides of the wrapper and, by the expansion of their component parts, effect the formation of all the end folds at a single operation of the end folders.

*The label-feeding and affixing mechanism.* (See Figs. 1, 2, 3, 4, 5, 32, 33, 34, 35, 36, 37.)—When the presser 123 is at its elevated position and the end folders 134 are at their lowered or starting position, the label 169 is fed by the labeling mechanism to a position opposite the peaks of the folds. The labels 169, as shown in Figs. 33, 34, 35 and 36, are wound on drums 170 revolubly held by supports 171 from the main frame 6, and the labels, as they are unwound from the drums 170, pass between feed rolls 172 and 173 to the moistening rolls 175 against which they are pressed by pivoted guides 174 to maintain them in a flat condition when engaging the moistening rolls 175 and to prevent them curling when moistened, the guides 174 being provided with weights 174$^a$ and so pivoted to the casing 178$^a$ that they will act by gravity to press the labels against the moistening rolls.

The moistening rolls 175 are preferably covered with felt or other absorbent material 176 and revolve in water troughs 177 supplied by gravity from a reservoir 178. The feed rolls 172 are provided with ratchet wheels 179 rotated by pawls 180, the pawls 180 being connected to arms 181 loosely mounted on the arbors 182 of the feed rolls 172. The arms 181 are connected by a link 183 to cause their united movement for the uniform feed of the labels. The link 183 is connected by universal couplings 184 with a lever 185 having a roller 186 operating in the cam 187 on the cam shaft 11, see Fig. 32. During the revolution of the cam 187, it oscillates the lever 185 which, during its oscillating movement, actuates the universal coupling 184 and link 183 to move the pawls into engagement with the teeth of the ratchet wheels 179 and rotate them about one-eighth of a revolution. The rotating movement of the ratchet wheels is imparted to the feed rolls 172 and 173, and these feed rolls, as they rotate, draw the labels from the drums 170 and feed them between the pivoted guides 174 and moistening rolls 175. The labels are so wound on the drums 170 and fed therefrom that their adhesive surface will be to the outer sides of the peaks of the end folds when formed.

To effect the rotation of the moistening rolls 175, the arbors of the feed rolls 172 are formed with eccentrics 190 on which are loosely mounted the eccentric straps 191 of the eccentric rods 192. The eccentric rods 192 are provided with pawls 193 engaging with the teeth of the ratchet wheels 194 on the arbors of the moistening rolls 175. The eccentrics 190 and eccentric rods 192 and pawls 193, at each revolution of the feed rolls 172, cause a partial rotation of the ratchet wheels 194 and moistening rolls 175. The object of this motion is to insure the absorbent material of the moistening rolls being continually and properly saturated with water to moisten the labels, and to continually change that part of the surface of the moistening rolls engaging the adhesive surface of the labels, so that the absorbent material of the moistening rolls will not become clogged with gum and impair their moistening functions, the adhesive when it comes into contact with the water in the troughs, immediately dissolving.

By continually rotating the moistening rolls in the water troughs 177, it is possible to make the moistening rolls not only self-cleaning, but also to insure a sufficient saturation of the absorbent to properly moisten the adhesive surfaces of the labels prior to being affixed to the peak folds.

When the labels have been fed from the drums 170 and properly positioned by the feed rolls 172 and 173, the presser 123 descends and engages the partly-wrapped article, as previously described. The end folders then rise to their elevated position and complete the formation of the end folds, the peaks of which are pressed against the moistened labels by the rollers 147.

At the back of the labels are presser pads 195, see Figs. 15 to 18 inclusive, and when the rollers 147 engage the fold-forming elements 136, see Fig. 6, they press these elements, the peaks of the folds, and the labels, against the presser pads 195 with sufficient pressure to affix the labels to what will ultimately be the outer sides of the peak folds, holding the peaks of the folds against the presser pads 195 until the end folders are fully withdrawn therefrom.

When the labels have been affixed to the peak folds, the end folders are withdrawn from the wrapper ends and shears are operated to sever the labels from the label strips. Each of the shears consists of two blades 196$^a$, 196$^b$ pivoted to the main frame 6, and these blades are provided with segmental gears 197, 197$^a$ which cause their united movement between their cutting and open positions, see Fig. 33. One blade 196$^a$ of each of the shears 196 is provided with a pin 198 having a crank 199, and these cranks are connected by a link 200. The link 200 is connected by a universal coupling 201 with a lever 202 actuated by a cam 203 on the cam shaft 11. The cam 203 is so timed that it actuates the lever 202 to operate the shears 196 when the end folders are withdrawn from the wrapper, which, as previously described, is subsequent to the labels being fixed to the peak folds.

When the labels have been severed, the peak turners 204 operate to turn the peak folds down against the ends of the package. These turners 204 are hinged to the ends of the presser 123 and are provided with pinions 205 meshing with racks 206 movable in guideways 207, as shown in Fig. 32$^a$. The racks 206 are provided with a second set of rack teeth 208 meshing with segmental gears 209 fixed to a rock shaft 210. The rock shaft 210 has a crank 211 connected by a link 212 with a lever 213 fixed on a sleeve 214 loosely mounted on the rock shaft 161. The sleeve 214 is provided with a crank 215 having a roller 216 engaging in a cam 217 on the cam shaft 11, see Fig. 6.

During the revolution of the cam 217, the lever 213 oscillates the rock shaft 210 which during its oscillation, causes the segmental gears 209 to mesh with the rack teeth 208 and lower the racks 206. The racks 206, during their downward movement, cause the oscillation of the pinions 205, and this oscillation moves the peak turners 204 from a vertical position above the presser 123, see Fig. 15, to a vertical position below it, see Fig. 17. As the peak turners move from their vertical position, they turn the peak folds down over the fingers 218 and close the peak folds against the ends of the package, at the same time, pressing the projecting parts of the labels against the other end folds of the wrapper to effect the sealing of the labels and consequently the peak folds thereto.

To bend the peak folds sharply over the fingers 218, the peak turners 204 are provided with springs 219 which closely hug the fingers 218 as the peak turners move from their vertical position above the pressers to their vertical position below them, so that when the peak folds are turned against the package ends, the lines of the folds will be clearly and evenly defined along the top side of the wrapper. When the peak folds have been turned against the package ends, and while the peak turners 204 are still in their lowered position, two label pressers 220 are operated to press against the labels below the peak turners and apply a positive pressure to them to securely affix them to the package ends, see Figs. 6 and 37.

The label pressers 220 are pivoted to links 221 rockably connected to standards 222 suitably connected to the main frame 6, and operating the label pressers 220 are levers 223 actuated by cams 224 on the conveyer drive shaft 49. When the peak turners 204 have closed the peak folds against the package ends, the cams 224 actuate the levers 223 to force the label pressers 220 into engagement with the labels below the peak turners and hold them in contact therewith until the adhesion of the labels has been reasonably assured. The cams 224 then operate to restore the levers 223 and label pressers 220 to their normal position, and during this movement, the peak turners 204 are restored to their elevated position for the succeeding action of the machine.

When the peak turners have been restored to their elevated position, the presser 123 rises and simultaneously with the upward movement of the presser, the lever 213 operates to rock the shaft 210 and raise the racks 206, the upward and downward movement of the rock shaft 210 being timed in unison with the upward and downward movement of the presser, so that while the presser is moving either in an upward or downward direction, there will be no action on the part of the racks 206 and pinions 205 to move the peak turners 204 from their elevated position, which is maintained until the peak folds have been formed and the end folders withdrawn from the folded ends of the wrapper.

*The end pressers.* (See Figs. 1, 4, 6 and 40.)—The package supporting table 124 extends beyond the presser 123 and is provided with slideways 225 for the slides 225ᵃ, to which are hinged presser plates 226, see Fig. 40. The free ends of the presser plates 226 are movable toward and away from each other, their movement from each other being effected by means of springs 227 which draw them toward the slideways 225 and normally hold them in close proximity thereto. The slides 225ᵃ are moved back and forth in the slideways 225 by means of arms 228 with link connections 229. The arms 228 are fixed on a sleeve 230 oscillating on the shaft 231 journaled in the main frame 6. The sleeve 230 is provided with a segmental gear 232 meshing with a segmental gear 233 fixed on the rock shaft 161 journaled in the main frame 6. The rock shaft 161 is provided with a crank 235 having a roller 236 engaging in a cam 237 on the cam shaft 11, see Fig. 40.

During the revolution of the cam 237, the roller 236 and crank 235 oscillate the rock shaft 161 to cause the gears 233 and 232 to oscillate the sleeve 230, the oscillation of which first moves the slides 225ᵃ and presser plates 226 in the direction of the end folders. The presser plates 226, as they move in the direction of the end folders, are close to the slideways 225, which may be termed "the expanded position of the presser plates", so that they will clear the ends of the wrapped package without coming into contact with the wrapper.

When the slides 225ᵃ and presser plates 226 reach their limit of movement in the direction of the end folders, presser dogs 238 pivoted to the slides 225ᵃ come to a position where they will be engaged by trip levers 239. The trip levers 239 are fixed to a sleeve 240 loosely mounted on the rock shaft 155, and the sleeve 240 is actuated by a cam 241 on the cam shaft 11. Fixed on the sleeve 240 are two detents 242 movable vertically at the sides of the package supporting table 124 to engage behind the partly-wrapped package when the transfer carriage 77 delivers it to the end folders, the purpose of the detents being to hold the partly-wrapped package in its delivered position and prevent it being withdrawn therefrom when the transfer carriage recedes to its starting position, see Figs. 15 to 18 inclusive.

When the labels have been affixed to the peak folds, the slides 225ᵃ move forward and bring the fingers 218 which are connected to the presser plates 226 into position at the wrapper ends. The fingers 218 are formed of flat metal bars, and are so positioned that they are approximately opposite the top edges of the wrapped article and are designed for the purpose of defining the lines along which the peak folds are to be turned, see Fig. 40. When the fingers 218 come into position at the ends of the wrapped article, they hold the end folds together while the end folders are being withdrawn therefrom. The fingers 219 also support the top edge of the wrapper while the peak folds are being turned to their closed position against the ends of the package.

*The starting and stopping mechanism for the machine.* (See Figs. 1, 2, 3, 4, 40, 41.)—The main shaft 52 is provided preferably with an electric drive 245 which may consist of a magnetic clutch or a motor, and in either of these cases, the electrical apparatus is provided with conductors 246 leading to a switch 247 set at the front end of the table 124 centrally above the conveyer 46. The switch 247 is provided with two push buttons 248, 249 which respectively open and close the circuit of the current through the electric drive 245. The push button 249 is operated to close the circuit through the switch, and when so operated, it extends the push button 248 beyond the switch box 250. Fulcrumed to the switch box 250 is a bell crank lever 251, the short arm 252 of which is opposed to the push button 248 and the long arm 253 of which is hinged to a controlling lever 254 fixed to a rock shaft 255. The rock shaft 255 is provided with a crank arm 256 having a roller 257 engaging with a cam 258 on the elevator rock shaft 113.

As the rock shaft 113 oscillates, it brings the high point of the cam 258 into and out of engagement with the roller 257. When the high point of the cam 258 is in engagement with the roller 257, it holds the crank arm 256 and controlling lever 254 in an inoperative position, so that it will not influence the lever 251 to actuate the push button 248 and open the switch.

The free end of the lever 254 is provided with an extension 254ᵃ, bent toward the conveyer 46, the purpose of which is to engage the articles as they pass along the conveyer to the elevator 5. When an article is passing along the conveyer, it engages the bent extension 254ᵃ and upholds the free end of the lever 254 regardless of whether the roller 257 is in engagement with the high point of the cam 258 or not. When, however, the passage of the articles along the conveyer is discontinued and there is no article below the bent part 254ᵃ of the lever 254, the free end of the lever 254 will descend when the depressed part of the cam 258 is opposite the roller 257 and cause the descent of the long arm 253 of the lever 251. The downward movement of the long arm 253 brings the short arm 252 into engagement with the push button 249 and actuates it to open the switch and shut off the current to the electric drive. In this way, it is possible to automatically control the operation of the machine through the feed of the articles to the elevator and by doing so, prevent a waste of the paper and labels.

Having thus fully described the nature of our invention, what we claim as new and desire to secure by Letters Patent, is:—

1. In a wrapping machine, means for bringing two opposed sides of an unformed wrapper together and folding them lengthwise of their adjacent edges to form the wrapper to a tubular shape, said means comprising two jaws closable together, whereby the folded formation of the said edges will be maintained during the succeeding action of the machine, and means for removing said folded edges transversely of said jaws.

2. In a wrapping machine, means for bringing two opposed sides of an unformed wrapper together and folding them lengthwise of their adjacent edges to form the wrapper to a tubular shape, said means comprising two closable jaws, means for opening said jaws to receive and fold said edges, means for rotating the jaws, said jaws during their rotation being closed on said folded edges, means for reopening the said jaws at the completion of their rotation, and means for removing the folded edges therefrom.

3. In a wrapping machine, means for bringing two opposed sides of an unformed wrapper together and folding them lengthwise of their adjacent edges to form the wrapper to a tubular shape, and reciprocating means co-acting therewith for the removal of the fold from the fold-forming means, said reciprocating means moving across the said fold-forming means and withdrawing the completed fold of the wrapper transversely therefrom.

4. In a wrapping machine, two normally-separated fold-forming elements comprising two closable jaws, and means actuating them whereby they will bring two opposed sides of an unformed wrapper together and fold them lengthwise of their adjacent edges to form the wrapper to a tubular shape, and means movable transversely of the tubular wrapper to open and close the said jaws.

5. In a wrapping machine, two co-acting fold-forming elements to bring two opposed wrapper sides together and fold them lengthwise of their adjacent edges to form the wrapper to a tubular shape, one of the said fold-forming elements comprising two closable jaws having an oscillating movement between the position in which they co-act with the other elements to form the fold and the position from which the fold is removed from it, and means movable transversely to said jaws to remove the fold therefrom.

6. In a wrapping machine, two normally-separated fold-forming elements, co-acting one with the other to bring two opposed sides of a wrapper together and fold them lengthwise of their adjacent edges to form the wrapper to a tubular shape, and means actuating one of the fold-forming elements to inturn the folded edges against the adjacent wrapper side, the latter fold-forming element comprising two closable jaws arranged to compress the parts of the said folded edges together during the inturning operation, and means movable transversely to said jaws to remove the fold therefrom.

7. In a wrapping machine, two normally-separated fold-forming elements, co-acting one with the other to bring two opposed sides of a wrapper together and fold them lengthwise of their adjacent edges to form the wrapper to a tubular shape, means actuating one of the fold-forming elements to inturn the folded edges against the adjacent wrapper side, and means movable across the line of the fold for removing the folded edges laterally from the fold-forming element when inturned thereby.

8. In a wrapping machine, means for causing a wrapper to conform to three sides of the article to be wrapped, means for bringing and folding two opposed sides of the wrapper together to conform to the fourth side of the article, thereby forming the wrapper to a tubular shape and interlocking the said sides of the wrapper in a double fold, and transfer means movable in a direction transverse to the said double fold to withdraw the completed double fold laterally from its folding means.

9. In a wrapping machine, two normally-separated fold-forming elements, means for delivering an article and its unformed wrapper to the fold-forming elements, and means actuating the fold-forming elements to bring two opposed sides of the wrapper together and fold them lengthwise of their adjacent edges to form the wrapper to a tubular shape, one of said fold-forming elements comprising closable jaws and means for moving said jaws to inturn the folded edges against the adjacent wrapper side, and means movable transversely to said jaws for removing said folded edges therefrom.

10. In a wrapping machine, two fold-forming elements, one of said elements comprising two closable jaws normally held in an open position, the other of said elements being movable into and out of operative relation with said jaws, and means for actuating said fold-forming elements, whereby two opposed sides of a wrapper may be brought together and folded lengthwise of their adjacent edges to form the wrapper to a tubular shape, said jaws closing together to engage the wrapper, whereby the folded formation of its edges will be maintained during the succeeding action of the machine, and means movable transversely to said jaws for removing the folded edges therefrom.

11. In a wrapping machine, two normally-separated fold-forming elements, one of said elements comprising two spring-pressed jaws normally held in an open position, means for oscillatingly supporting said jaws, and means moving the other fold-forming element into and out of operative relation with said jaws, whereby it will bring two opposed sides of a wrapper together and push them unitedly between said jaws and fold them lengthwise of their adjacent edges, said jaws closing together to engage the wrapper, whereby the folded formation of its edges will be maintained during the succeeding action of the machine, and means movable transversely to said jaws for removing the folded edges therefrom.

12. In a wrapping machine, two normally-separated fold-forming elements, one of said elements comprising two spring-pressed jaws normally held in an open position, means for oscillatingly supporting said jaws, means moving the other fold-forming element into and out of operative relation with said jaws, whereby it will bring two opposed sides of a wrapper together and push them unitedly between said jaws and fold them lengthwise of their adjacent edges, and means for causing the oscillation of said jaws between their fold-forming and fold-delivering positions, said jaws closing together to engage the wrapper, whereby the folded formation of its edges will be maintained during the succeeding action of the machine, and means movable transversely to said jaws for removing the folded edges therefrom.

13. In a wrapping machine, two normally-separated fold-forming elements, one of said elements comprising a pair of spring-closed jaws oscillatingly mounted to turn from their fold-forming to their fold-delivering position, the other of said fold-forming elements being reciprocatingly movable into and out of operative relation with said jaws, said jaws closing together to engage the wrapper, whereby the folded formation of its edges will be maintained during the succeeding action of the machine, and means movable transversely to said jaws for removing the folded edges therefrom.

14. In a wrapping machine, two normally-separated fold-forming elements, one of said elements comprising a pair of relatively movable spring-closed jaws oscillatingly mounted to turn from their fold-forming to their fold-delivering position to positively grasp the fold of the wrapper and inturn the same to form a double fold, the other of said fold-forming elements being reciprocatingly movable into and out of operative relation with said jaws, means for opening said jaws when they reach their limit of motion at each end of their oscillation, and means movable transversely to said jaws to remove the folded edges therefrom.

15. In a wrapping machine, a set of fold-forming elements one of said fold-forming elements having an oscillating movement from its fold-forming to its fold-delivering position and having one or more stopping members projecting into the path of the package at one side thereof to correctly position it with relation to said oscillating fold-forming element when at its fold-forming position and receding therefrom when said fold-forming element moves to its fold delivering position, and presser means at the opposite side of the package to push it to said stopping members.

16. In a wrapping machine, a set of fold-forming elements, one of said fold-forming elements having an oscillating movement from its fold-forming to its fold-delivering position and having one or more stopping members projecting into the path of the package at one side thereof to correctly position it with relation to said oscillating fold-forming element when at its fold-forming position and receding therefrom when said fold-forming element moves to its fold delivering position, and presser means at the opposite side of the package to push it to said stopping members, and means movable beneath the partially-wrapped article to deliver it from said fold-forming elements.

17. In a wrapping machine, means for causing a wrapper to conform to three sides of the article to be wrapped, means for bringing and folding two opposed sides of the wrapper together to conform to the fourth side of the article, thereby forming the wrapper to a tubular shape and interlocking the said sides of the wrapper in a double fold, end-folders arranged beyond the said folding means, and transfer means movable in a direction transverse to the said wrapper tube to withdraw the completed double fold laterally from its folding means and to transfer the article and tubular wrapper to a point between the said end-folders.

18. In a wrapping machine, two fold-forming elements normally separated a distance greater than one dimension of the article to be wrapped and comprising two closable jaws, means for delivering the article and its unformed wrapper between them, means actuating the fold-forming elements to bring two opposed sides of the wrapper together and fold them along their adjacent edges and thus form the wrapper to a tubular shape, means for causing the rotation of said jaws to inturn the folded edges, said jaws being closed thereon during their rotation, and means movable transversely to said jaws for reopening them and for removing the article and tubular-shaped wrapper from said fold-forming elements.

19. In a wrapping machine, a set of fold-forming elements comprising two closable jaws for grasping positively and in turning the edges of the wrapper to form a double fold, means for delivering an article thereto, means for interposing a wrapper across the path of said article to be delivered therewith to said fold-forming elements, and means actuating the fold-forming elements to bring two opposed sides of the wrapper together and fold them lengthwise of their adjacent edges, whereby they form the wrapper to a tubular shape around the article, and means movable transversely to said jaws for removing the folded edges therefrom.

20. In a wrapping machine, a set of fold-forming elements comprising two closable jaws for grasping positively and inturning the edges of the wrapper to form a double fold, means for delivering an article thereto, intermittently-acting means for interposing a wrapper across the path of said article to be delivered therewith to said fold-forming elements, and means actuating the fold-forming elements to bring two opposed sides of the wrapper together and fold them lengthwise of their adjacent edges, whereby they form the wrapper to a tubular shape around the article, and means movable transversely to said jaws for removing the folded edges therefrom.

21. In a wrapping machine, two normally-separated fold-forming elements comprising two closable jaws for grasping positively and inturning the edges of the wrapper to form a double fold, means for delivering an article with its wrapper between them, and means actuating them to bring two opposed sides of the wrapper together and fold them along their adjacent edges and thus form the wrapper to a tubular shape, one of said fold-forming elements oscillating from its fold-forming position for the delivery of said folded edges therefrom, and means movable transversely to said jaws for removing the folded edges therefrom.

22. In a wrapping machine, a set of fold-forming elements, one of said elements oscillating between its fold-forming and fold-delivering positions, said oscillating element comprising two spring-pressed jaws with projecting members, a stationary opening element to engage the projecting member of one of said jaws to open them when at their fold-forming position, and a movable opening member to engage the projecting member of the other jaw and open them when at their fold-delivering position.

23. In a wrapping machine, a set of fold-forming elements, one of said elements oscillating between its fold-forming and its fold-delivering positions and having one or more stopping members projecting into the path of the package at one side thereof and receding therefrom when said fold-forming element moves to its delivery position.

24. In a wrapping machine, a set of fold-forming elements, one of said elements oscillating between its fold-forming and its fold-delivering positions and having one or more stopping members projecting into the path of the package at one side thereof and receding therefrom when said fold-forming element moves to its delivery position, presser means at the opposite side of the package, and means actuating said presser means to push the package against said stopping members whereby it will be correctly positioned with relation to said fold-forming elements.

25. In a wrapping machine, a set of fold-forming elements, one of said elements having an oscillating movement from its fold-forming to its fold-delivering position and having one or more stopping members projecting into the path of the package at one side thereof to correctly position it with relation to said oscillating fold-forming element when at its fold-forming position and receding therefrom when said fold-forming element moves to its delivery position, presser means at the opposite side of the package, and means actuating the presser means to push said package to said stopping members and then releasing said presser from said package.

26. In a wrapping machine, wrapper feeding means, a set of fold-forming elements comprising two closable jaws for grasping positively and inturning the edges of the wrapper to form a double fold, means for delivering an article and its unformed wrapper to the fold-forming elements, means actuating the fold-forming elements to bring two opposed sides of the wrapper together and fold them lengthwise of their adjacent edges to form the wrapper to a tubular shape, and means associated therewith for delivering the article and its tubular-shaped wrapper from said fold-forming elements, and means movable transversely to said jaws for removing the folded edges therefrom.

27. In a wrapping machine, wrapper feeding means, a set of fold-forming elements comprising two closable jaws for grasping positively and inturning the edges of the wrapper to form a double fold, means for delivering an article and its unformed wrapper to the fold-forming elements, means for correctly positioning the article with its unformed wrapper relatively to said fold-forming elements, means actuating the fold-forming elements to bring two opposed sides of the wrapper together and fold them lengthwise of their adjacent edges to form the wrapper to a tubular shape, and means for delivering the article and its tubular-shaped wrapper from said fold-forming elements, and means movable transversely to said jaws for removing the folded edges therefrom.

28. In a wrapping machine, wrapper feeding means, a set of fold-forming elements, one of said fold-forming elements having an oscillating movement from its fold-forming to its fold-delivering position and having one or more stopping members projecting into the path of the package at one side thereof and receding therefrom when said fold-forming element moves to its delivery position, presser means at the opposite side of the package to push it to said stopping members and correctly position it with relation to said oscillating fold-forming element when at its fold-forming position, means actuating said presser means, and means for delivering the package from said fold-forming elements.

29. In a wrapping machine, wrapper feeding means, a set of fold-forming elements, one of said fold-forming elements having an oscillating movement from its fold-forming to its fold-delivering position and having one or more stopping members projecting into the path of the package at one side thereof and receding therefrom when said fold-forming element moves to its delivery position, presser means at the opposite side of the package to push it to said stopping members and correctly position it with relation to said oscillating fold-forming element when at its fold-forming position, means actuating said presser means, and means for delivering the package from said fold-forming elements when said oscillating fold-forming element is at its delivery position.

30. In a wrapping machine, two fold-forming elements, one of said elements oscillating between its fold-forming and delivering positions, said oscillating member consisting of two closable jaws, means associated therewith to open them for the forming of the fold, and other means associated therewith to open them for the delivering of the fold, and means causing the oscillation of said jaws between their fold-forming and fold-delivering positions, the other of said fold-forming elements being movable into and out of operative relation with said jaws at their fold-forming position to bring two opposed sides of a wrapper together and by pressing them into said jaws, effect the formation of a fold along their adjacent edges.

31. In a wrapping machine, two fold-forming elements, one of said elements oscillating between its fold-forming and delivering positions, said oscillating member consisting of two closable jaws, means associated therewith to open them for the forming of the fold, and other means associated therewith to open them for the delivering of the fold, and means causing the oscillation of said jaws between their fold-forming and fold-delivering positions, the other of said fold-forming elements being movable into and out of operative relation with said jaws at their fold-forming position to bring two opposed sides of a wrapper together and by pressing them into said jaws, effect the formation of a fold along their adjacent edges, and means for removing the fold from said oscillating fold-forming element when at its delivery position.

32. In a wrapping machine, means for conforming a wrapper to a tubular shape around the article, means for folding the ends of the tubular-shaped wrapper whereby the peaks of the end folds extend beyond the wrapper sides, means for affixing labels to the peaks of said end folds whereby said labels project therebeyond, and means for turning the peak folds and labels against the package ends whereby said labels will secure the peak folds thereto.

33. In a wrapping machine, means for conforming a wrapper to a tubular shape around the article, means for folding the ends of the tubular-shaped wrapper whereby the peaks of the end folds extend beyond the wrapper sides, means for affixing labels to the peaks of said end folds whereby said labels project therebeyond, and means for turning the peak folds and labels against the package ends whereby said labels will secure the peak folds, and means for pressing the labels against said folds to insure their adhesion thereto.

34. In a wrapping machine, means to bring two opposed sides of a wrapper together and fold them along their adjacent edges to conform the wrapper to a tubular shape around the article, said means comprising two closable jaws for grasping positively and inturning the edges of the wrapper to form a double fold, means movable transversely to said jaws for removing the folded edges therefrom, and means for folding the ends of the tubular-shaped wrapper.

35. In a wrapping machine, means to bring two opposed sides of a wrapper together and fold them along their adjacent edges to conform the wrapper to a tubular shape around the article, said means comprising two closable jaws for grasping positively and inturning the edges of the wrapper to form a double fold, means movable transversely to said jaws for removing the folded edges therefrom, means for folding the ends of the tubular-shaped wrapper, and means for securing the ends in their folded condition.

36. In a wrapping machine, means to bring two opposed sides of a wrapper together and fold them along their adjacent edges to conform the wrapper to a tubular shape around the article, said means comprising two closable jaws for grasping positively and inturning the edges of the wrapper to form a double fold, means movable transversely to said jaws for removing the folded edges therefrom, means for bringing an article and its unformed wrapper into operative relation therewith, and means for folding the ends of the tubular-shaped wrapper.

37. In a wrapping machine, means to bring two opposed sides of a wrapper together and fold them along their adjacent edges to conform the wrapper to a tubular shape around the article, said means comprising two closable jaws for grasping positively and inturning the edges of the wrapper to form a double fold, means movable transversely to said jaws for removing the folded edges therefrom, means for bringing an article and its unformed wrapper into operative relation therewith, means for folding the ends of the tubular-shaped wrapper, and means for securing the ends in their folded condition.

38. In a wrapping machine, means to bring two opposed sides of a wrapper together and fold them along their adjacent edges to conform the wrapper to a tubular shape around the article, means for bringing an article and its unformed wrapper into operative relation therewith, means for folding the ends of the tubular-shaped wrapper, and means for affixing labels to said ends while the end-folding means are still in engagement with the wrapper.

39. In a wrapping machine, means to bring two opposed sides of a wrapper together and fold them along their adjacent edges to conform the wrapper to a tubular shape around the article, means for bringing an article and its unformed wrapper into operative relation therewith, means for folding the ends of the tubular-shaped wrapper, means for affixing labels to said ends while the end-folding means are still in engagement with the wrapper, and means for pressing the labels and folded ends together.

40. In a wrapping machine, means to bring two opposed sides of a wrapper together and fold them along their adjacent edges to conform the wrapper to a tubular shape around the article, said means comprising two closable jaws for grasping positively and inturning the edges of the wrapper to form a double fold, means movable transversely to said jaws for removing the folded edges therefrom, means for bringing the article to be wrapped into operative relation therewith, means for interposing a wrapper in the path of said article so that it will conform to three sides thereof as the article moves into operative relation with said folding means, and means for folding the ends of the tubular-shaped wrapper.

41. In a wrapping machine, means to bring two opposed sides of a wrapper together and fold them along their adjacent edges to conform the wrapper to a tubular shape around the article, means for bringing the article to be wrapped into operative relation therewith, means for interposing a wrapper in the path of said article so that it will conform to three sides thereof as the article moves into operative relation with said folding means, means for folding the ends of the tubular-shaped wrapper, and means for affixing labels to said ends to secure them in their folded condition, while the end-folding means are still in engagement with the wrapper.

42. In a wrapping machine, means to bring two opposed sides of a wrapper together and fold them along their adjacent edges to conform the wrapper to a tubular shape around the article, means for bringing the article to be wrapped into operative relation therewith, means for interposing a wrapper in the path of said article so that it will conform to three sides thereof as the article moves into operative relation with said folding means, means for folding the ends of the tubular-shaped wrapper, means for affixing labels to said ends to secure them in their folded condition while the end-folding means are still in engagement with the wrapper and means for pressing the labels and folded ends together.

43. In a wrapping machine, two independently acting sets of folders, means for automatically feeding the wrapper across the path of the articles and cutting the wrapper into desired wrapper lengths, and means for delivering the article and its unformed wrapper to the folders, one set of folders comprising two closable jaws for grasping positively and inturning the edges of the wrapper to form a double fold, and opposing fold-forming means to engage two opposed sides of the unformed wrapper, bring them together, and fold them along their adjacent edges to form the wrapper to a tubular shape around the article, and the other set of folders comprising means for folding the ends of the tubular-shaped wrapper.

44. In a wrapping machine, two independently acting sets of folders, means for automatically feeding the wrapper across the path of the article and cutting the wrapper into desired wrapper lengths, means for delivering the article and its unformed wrapper to the folders, one set of folders comprising two closable jaws for grasping positively and inturning the edges of the wrapper to form a double fold, and opposing fold-forming means to engage two opposed sides of the unformed wrapper, bring them together, and fold them along their adjacent edges to form the wrapper to a tubular shape around the article, and the other set of folders comprising means for folding the ends of the tubular-shaped wrapper, and means for securing the wrapper ends in their folded condition.

45. In a wrapping machine, two independently acting sets of folders, means for automatically feeding the wrapper across the path of the article and cutting the wrapper into desired wrapper lengths, means for delivering the article and its unformed wrapper to the folders, one set of folders comprising means to engage two opposed sides of the unformed wrapper, bring them together, and fold them along their adjacent edges to form the wrapper to a tubular shape around the article, and the other set of folders comprising means for folding the ends of the tubular-shaped wrapper, and means for affixing labels to said wrapper ends to secure them in their folded condition, while the end-folding means are still in engagement with the wrapper.

46. In a wrapping machine, two independently acting sets of folders, means for automatically feeding the wrapper across the path of the article and cutting the wrapper into desired wrapper lengths, means for delivering the article and its unformed wrapper to the folders, one set of folders comprising means to engage two opposed sides of the unformed wrapper, bring them together, and fold them along their adjacent edges to form the wrapper to a tubular shape around the article, and the other set of folders comprising means for folding the ends of the tubular-shaped wrapper, means for affixing labels to said wrapper ends while the end-folding means are still in engagement with the wrapper, and means for pressing the labels and folded ends together.

47. In a wrapping machine, means for conforming a wrapper to a tubular shape around the article, means for folding the ends of the tubular-shaped wrapper whereby the peaks of the end folds extend beyond the wrapper sides, means associated with the end-folding means for automatically positioning the labels in juxtaposition to the peaks of the end folds, means for pressing the peaks of the end folds and labels together, means for closing the peak folds and labels against the package ends, and means for pressing the labels thereto.

48. In a wrapping machine, means for conforming a wrapper to a tubular shape around the article, means for simultaneously forming all the end folds of the tubular-shaped wrapper, and means associated therewith for affixing labels to the end folds, while the end-folding means are still in engagement with the wrapper.

49. In a wrapping machine, means for conforming a wrapper to a tubular shape around the article, means for simultaneously forming all the end folds of the tubular-shaped wrapper, means for automatically feeding and moistening the labels and positioning them adjacent to the end folds, and means for pressing the labels and end folds together, while the end-folding means are still in engagement with the wrapper.

50. In a wrapping machine, means for conforming a wrapper to a tubular shape around the article, means for folding the ends of the tubular-shaped wrapper comprising end folders which engage the ends of one side of the wrapper and fold them against the ends of the article and then enter the wrapper interiorly of the remaining sides to define the lines along which the remaining folds are to be made, and then, by engaging said sides, draw the wrapper ends to their folded condition, in combination, with label feeding and moistening means, and means for affixing the labels to the end folds, while the end-folding means are still in engagement with the wrapper.

51. In a wrapping machine, means for conforming the wrapper to a tubular shape around the article, and means for folding the ends of the tubular-shaped wrapper, in combination with label feeding and moistening means comprising feeding and moistening rolls, actuating means therefor, means for affixing the labels to the end folds while the end-folding means are still in engagement with the wrapper, and operable shears to sever the labels when affixed to the end folds.

52. In a wrapping machine, means for conforming the wrapper to a tubular shape around the article, and means for folding the ends of the tubular-shaped wrapper whereby the peaks of the end folds extend beyond the wrapper sides, in combination with label feeding and moistening means comprising feeding and moistening rolls, actuating means therefor, means for affixing the labels to the end folds prior to folding the end peaks against the package ends, and operable shears to sever the labels when affixed to the end folds.

53. In a wrapping machine, means for conforming a wrapper to a tubular shape around the article and means for folding the ends of the tubular-shaped wrapper in combination with label feeding and moistening means comprising feed rolls for intermittently feeding the labels to the wrapper ends, moistening rolls associated therewith, reservoirs from which the moistening rolls are saturated, means for intermittently rotating the feed rolls, means for intermittently rotating the moistening rolls, and means for affixing the labels to the end-folds while the end-folding means are still in engagement with the wrapper.

54. In a wrapping machine, means for conforming a wrapper to a tubular shape around the article and means for folding the ends of the tubular-shaped wrapper in combination with label feeding and moistening means comprising feed rolls for intermittently feeding the labels to the wrapper ends, moistening rolls associated therewith, reservoirs from which the moistening rolls are saturated, means for intermittently rotating the feed rolls, means for intermittently rotating the moistening rolls, means for affixing the labels to the end folds, shears for severing the labels when affixed to the end folds, means for actuating the shears, and means for affixing the labels to the end-folds while the end-folding means are still in engagement with the wrapper.

55. In a wrapping machine, means for conforming a wrapper to a tubular shape around the article, means for folding the ends of the tubular-shaped wrapper and drawing the end folds to projecting peaks, means for affixing labels to the peaks of said end folds, while turned away from the ends of the package, means for turning the peak folds and labels against the package ends whereby said labels will secure the peak folds thereto and means for defining the lines along which said peak folds are turned.

56. In a wrapping machine, means for conforming a wrapper to a tubular shape around the article, means for folding the ends of the tubular-shaped wrapper and drawing the end folds to projecting peaks, means for turning the peak folds against the package ends, and means for defining the lines along which the peak folds are turned, consisting of laterally movable fingers over which the said peaks are turned.

57. In a wrapping machine, means for conforming a wrapper to a tubular shape around the article and means for folding the ends of the tubular-shaped wrapper, in combination with label feeding and moistening means, means for affixing the labels to the folded ends and pressing them thereto, and means for pressing the labels and folded ends against the article whereby the labels will adhere to the wrapper.

58. In a wrapping machine, fold-forming elements comprising bodily rotatable closable jaws, means for rotating the said jaws simultaneously for the production of an interlocking double seam or fold along the edges of the wrapper, and reciprocating means for opening said jaws for the removal of said seam or fold.

59. In a wrapping machine, fold-forming elements comprising bodily rotatable closable jaws for forming a double fold in the edges of the wrapper, end-folders for folding the ends of the wrapper, transfer means movable in a direction transverse to the said double fold for withdrawing the latter from the said jaws and for transferring the article to be wrapped to a position between the said end-folders, means movable in the said transverse direction for bodily rotating the said jaws, and means movable in the said transverse direction for opening and closing the jaws to receive the edges of the wrapper and to release the said double fold.

60. In a wrapping machine, means for conforming a wrapper to a tubular shape around the article, means for feeding the ends thereof so that the peaks of the end folds will project beyond the wrapper sides, means for affixing labels to the peaks of the end folds whereby said labels will project therebeyond, and means for turning the peak folds and labels against the package ends and securing them thereto.

61. In a wrapping machine, a side folder comprising two fold-forming elements, one of said elements consisting of two closable jaws normally maintained in an open position for the formation of the side folds and the other element having a reciprocating motion into and out of operative relation with said jaws, the said jaws closing together to engage the wrapper whereby the folded formation of its edges will be maintained during the succeeding action of the machine, and means movable transversely to said jaws for removing the folded edges therefrom.

62. In a wrapping machine, a side folder comprising two fold-forming elements, one of said elements consisting of two closable jaws normally maintained in an open position for the formation of the side folds and the other element having a reciprocating motion into and out of operative relation with said jaws, and means for causing the oscillation of said jaws from their fold-forming position to their fold-delivering position, the said jaws closing together to engage the wrapper whereby the folded formation of its edges will be maintained during the succeeding action of the machine, and means movable transversely to said jaws for removing the folded edges therefrom.

63. In a wrapping machine, a side folder comprising two fold-forming elements, one of said elements consisting of two closable jaws normally maintained in an open position for the formation of the side folds and the other element having a reciprocating motion into and out of operative relation with said jaws, means for causing the oscillation of said jaws from their fold-forming position to their fold-delivering position, and means for opening said jaws when they reach the limit of their oscillation in eitner direction, the said jaws closing together to engage the wrapper whereby the folded formation of its edges will be maintained during the succeeding action of the machine, and means movable transversely to said jaws for removing the folded edges therefrom.

64. In a wrapping machine, a side folder comprising two fold-forming elements, one of said elements consisting of two closable jaws normally maintained in an open position for the formation of the side folds and the other element having a reciprocating motion into and out of operative relation with said jaws, means for causing the oscillation of said jaws from their fold-forming position to their fold-delivering position, means for opening said jaws when they reach the limit of their oscillation in either direction, and means for removing the fold from said jaws when at their fold-delivering position, the said jaws closing together to engage the wrapper whereby the folded formation of its edges will be maintained during the succeeding action of the machine, and means movable transversely to said jaws for removing the folded edges therefrom.

65. In a wrapping machine, a set of side folders, means for delivering the article thereto, means for feeding a wrapper across the path of the article to be delivered therewith to the side folders, means actuating the side folders to bring the adjacent edges of two opposed sides of the wrapper together and fold them lengthwise of the package whereby the wrapper will be conformed to a tubular shape around the article, a set of end folders to close the ends of the tubular-shaped wrapper, means for affixing labels to the end folds while the end-folding means are still in engagement with the wrapper, and means for pressing the labels and end folds together.

66. In a wrapping machine, means for conforming a wrapper to a tubular shape around the article, means for forming the end folds of the tubular-shaped wrapper with the peaks thereof projecting beyond the wrapper sides, operable means consisting of laterally movable fingers over which the said peaks are turned to define the lines along which the peak folds are turned, means for closing the peak folds against the package ends, and means for securing the end folds together.

67. In a wrapping machine, means for conforming a wrapper to a tubular shape around the article, means for forming the end folds of the tubular-shaped wrapper with the peaks thereof projecting beyond the wrapper sides, operable means consisting of laterally movable fingers over which the said peaks are turned to define the lines along which the peak folds are turned, means for closing the peak folds against the package ends, means for securing the end folds together, and means for then pressing the end folds in their closed condition.

68. In a wrapping machine, means for conforming a wrapper to a tubular shape around the article, means for forming the end folds with the peaks thereof projecting beyond the wrapper sides, means for affixing labels to the projecting peaks with the labels extending therebeyond, means for defining the lines along which the peak folds are turned, means for closing the peak folds against the package ends, means for pressing the peak folds and labels thereto to secure the end folds together, and means for pressing the labels and end folds until their adhesion has been effected.

Toronto, June 19th, 1913.

ARTHUR P. HOLDEN.
PHILIP MORGAN.

Signed in the presence of—
  EDWARD BERNSTEIN,
  CHAS H. RICHES.